(12) United States Patent
Schäfer et al.

(10) Patent No.: US 12,454,072 B2
(45) Date of Patent: Oct. 28, 2025

(54) SYSTEM FOR PROCESSING FOOD PRODUCTS

(71) Applicant: WEBER FOOD TECHNOLOGY SE & CO. KG., Breidenbach (DE)

(72) Inventors: Marvin Schäfer, Biedenkopf (DE); Thorsten Schneider, Weimar/Lahn (DE); Michael Knauf, Amöneburg (DE); Julian Nolte, Leun-Biskirchen (DE)

(73) Assignee: WEBER FOOD TECHNOLOGY SE & CO. KG, Breidenbach (DE)

( * ) Notice: Subject to any disclaimer, the term of this patent is extended or adjusted under 35 U.S.C. 154(b) by 308 days.

(21) Appl. No.: 18/085,169

(22) Filed: Dec. 20, 2022

(65) Prior Publication Data
US 2023/0219249 A1 Jul. 13, 2023

(30) Foreign Application Priority Data

Dec. 21, 2021 (DE) .......................... 102021134049.7

(51) Int. Cl.
*B26D 7/32* (2006.01)
*A22C 17/00* (2006.01)
(Continued)

(52) U.S. Cl.
CPC ............ *B26D 7/32* (2013.01); *A22C 17/0033* (2013.01); *A22C 17/0086* (2013.01);
(Continued)

(58) Field of Classification Search
CPC .......... B26D 7/28; B26D 7/32; B26D 7/0683; B26D 5/007; B26D 2210/02; B26D 7/30;
(Continued)

(56) References Cited

U.S. PATENT DOCUMENTS 3,824,885 A    7/1974   Marshall
4,026,421 A *   5/1977   Lotz ........................ B65B 35/50
                                                83/79
(Continued)

FOREIGN PATENT DOCUMENTS

DE         19713813 C1   10/1998
DE   102015109633 A1   12/2016
(Continued)

OTHER PUBLICATIONS

Machine translation of Lagares (WO 2005110106).*
(Continued)

*Primary Examiner* — Evan H MacFarlane
*Assistant Examiner* — Haleigh N Watson
(74) *Attorney, Agent, or Firm* — Dickinson Wright PLLC

(57) ABSTRACT

A system for processing food products comprises a slicing apparatus that is configured to cut off slices from food products and to form part portions having one or more slices in a portioning section. A transport device adjoining the portioning section is provided and the portioning section comprises a conveying device that transfers the part portions to the transport device. The system comprises a stacking apparatus that is configured to form a food portion comprising a plurality of part portions. The transport device is configured to transport the part portions onto a product support of the stacking apparatus, wherein the transport device and/or the stacking apparatus has/have a scale for measuring the weight of the part portions and/or of the food portion.

20 Claims, 13 Drawing Sheets

Figure 1A:
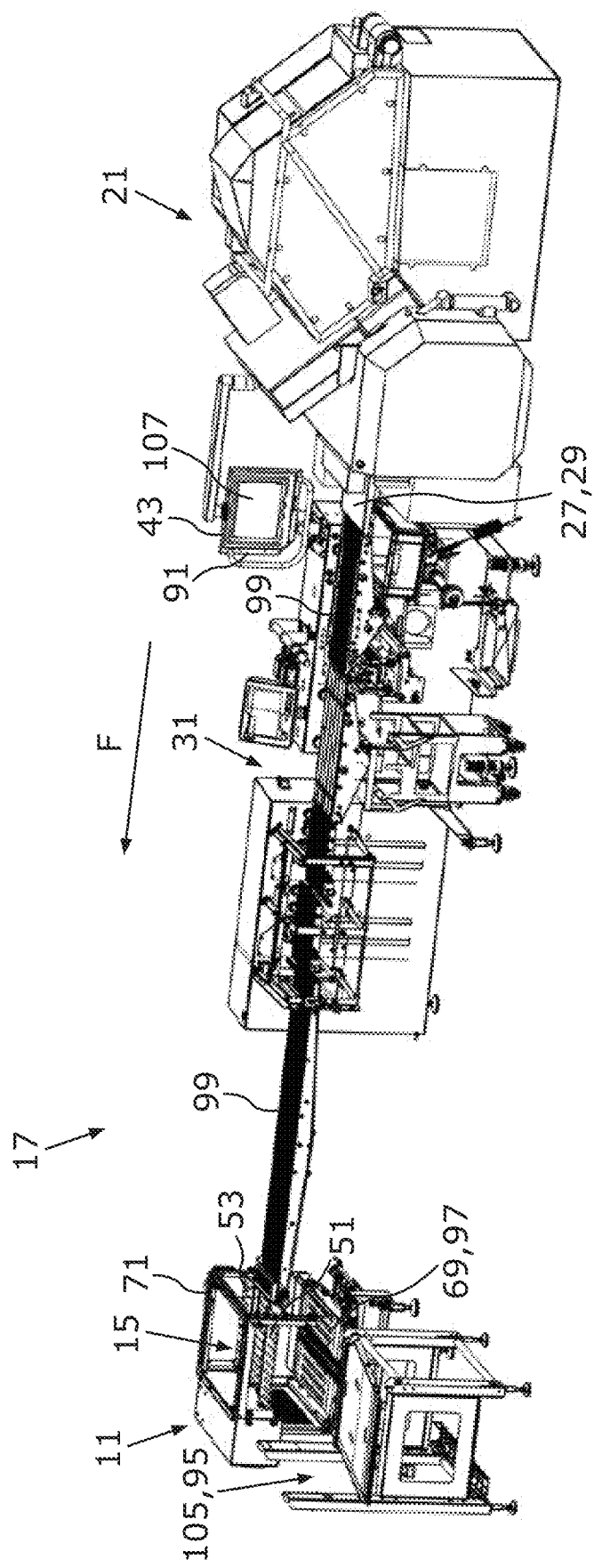

(51) Int. Cl.
*B26D 5/00* (2006.01)
*B26D 7/06* (2006.01)
*B26D 7/28* (2006.01)

(52) U.S. Cl.
CPC .......... *A22C 17/0093* (2013.01); *B26D 5/007* (2013.01); *B26D 7/28* (2013.01); *B26D 7/0683* (2013.01); *B26D 2210/02* (2013.01)

(58) Field of Classification Search
CPC ............ A22C 17/0033; A22C 17/0086; A22C 17/0093; B65B 25/06; B65B 25/07; B65B 25/08; B65G 57/00; B65G 57/06
USPC ........................................... 83/86, 88, 89, 90
See application file for complete search history.

(56) References Cited

U.S. PATENT DOCUMENTS

| | | | | |
|---|---|---|---|---|
| 4,405,186 A * | 9/1983 | Sandberg | ................. | B26D 7/32 414/790 |
| 5,054,345 A * | 10/1991 | Weber | ................. | A22C 17/0073 83/365 |
| 6,089,819 A * | 7/2000 | Barnes | .................. | B65G 57/00 414/796.8 |
| 8,643,851 B2 * | 2/2014 | Weber | .................. | B26D 3/283 356/615 |
| 9,327,909 B2 * | 5/2016 | Lischinski | ............. | B65G 43/08 |
| 9,956,738 B1 * | 5/2018 | Olson | .................... | B31B 70/10 |
| 2014/0318339 A1 * | 10/2014 | Briel | .................... | B65G 41/002 83/109 |

FOREIGN PATENT DOCUMENTS

| | | | | |
|---|---|---|---|---|
| EP | 3770566 A1 | | 1/2021 | |
| GB | 1448231 | * | 8/1972 | .............. B26D 7/30 |
| WO | WO-2005110106 A1 | * | 11/2005 | ............. A22C 18/00 |
| WO | WO-2021064145 A1 | * | 4/2021 | ............... B26D 1/18 |

OTHER PUBLICATIONS

Extended European Search Report dated May 25, 2023 corresponding to EP 22 20 9949, 8 pages.
Search Report mailed Jan. 11, 2023 corresponding to German Patent Application 10 2021 134 049.7, 24 pages.

* cited by examiner

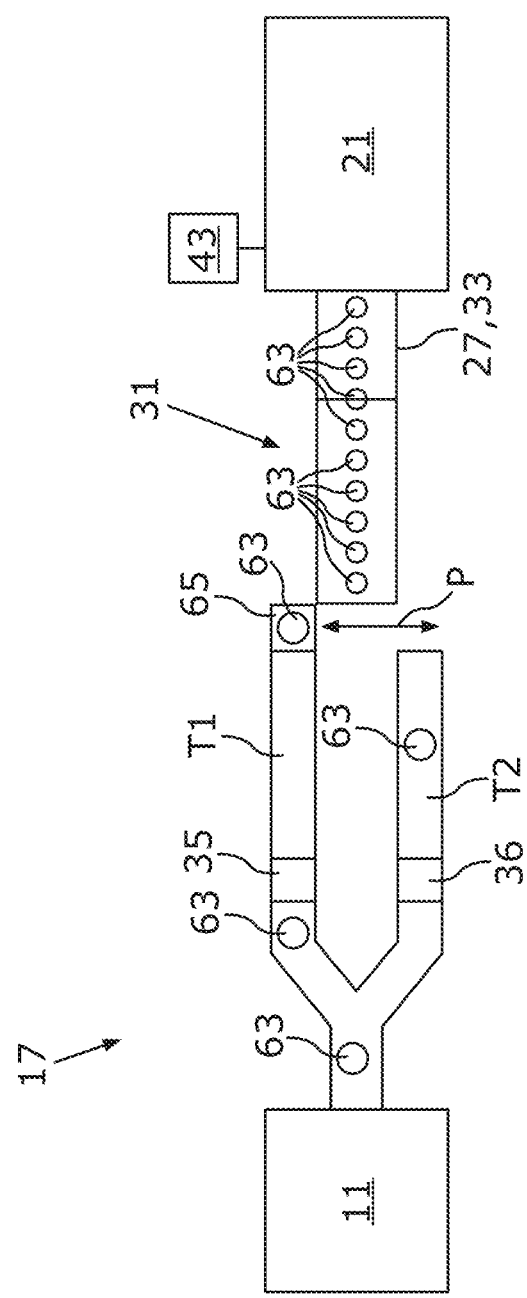

SYSTEM FOR PROCESSING FOOD PRODUCTS

CROSS-REFERENCES TO RELATED APPLICATIONS

This Patent Application claims the priority of German Patent Application No. 102021134049.7 filed on Dec. 21, 2021, which is incorporated herein by reference in its entirety.

The invention relates to a system for processing food products, in particular meat products, sausage, cheese, ham and/or bacon, that comprises a slicing apparatus that may in particular be configured as a high-performance slicer. The slicing apparatus comprises a portioning section and a blade movable in a cutting plane, in particular a circular blade revolving in the cutting plane or a scythe-like blade revolving in the cutting plane, and that is configured to cut off slices from bar-shaped food products guided into the cutting plane and to form part portions in the portioning section that comprise one or more cut-off slices. The system further comprises a stacking apparatus that has at least one product support movable between a feed position and a placement position and a stacking section arranged beneath the product support. The stacking apparatus is configured to place part portions moved onto the product support on the stacking section by moving the product support from the feed position into the placement position and to form a food portion comprising a plurality of part portions on the stacking section, in particular by stacking a plurality of part portions, which are successively moved onto the product support, on top of one another.

When processing food products, provision is frequently made to cut bar-shaped food products into slices and to form portions that comprise one or more of the cut-off slices in order to offer the food products for sale portioned in such a manner. In this respect, a high product throughput may in particular be achieved by using high-performance slicers that may achieve a cutting speed of up to 2000 cuts per minute. To form the portions, such slicing apparatuses may have a portioning section onto which the cut-off slices fall and on which the slices may be collected until a number of slices intended for a portioning has been assembled. In this respect, the portioning section may possibly be movable to be able to place the slices in a mutually overlapping and/or shingled manner, wherein a direct stacking of the slices on top of one another may also be provided. The completed portions comprising a plurality of slices may be fed from the portioning section to further processing steps and may in particular be packaged so that the food product may ultimately be sold packaged portion-wise.

While provision may in particular be made when selling the products to the end consumer to package the slices portioned by the slicing apparatus directly as one portion and to offer them for sale in such a manner, there may in particular be a need among bulk buyers, for instance the catering or hotel trade, for larger food portions that may no longer be formed directly at the portioning section of the slicing apparatus. To nevertheless be able to form such large food portions as automated as possible by means of a system for processing food portions, provision may be made to only form part portions at the portioning section of the slicing apparatus and to join together a plurality of these part portions in subsequent processing steps to form a common food portion.

For this purpose, in a system for processing food products, a stacking apparatus may be provided to which the part portions produced by the slicing apparatus may be guided and by means of which the received part portions may be successively placed on a stacking section to form a food portion on the stacking section that comprises a plurality of part portions produced by the slicing apparatus and that is ultimately intended for sale. For this purpose, the stacking apparatus may have a product support onto which the part portions may be guided to place the part portions on the stacking section by moving the product support into a placement position and in particular to stack the food portions on top of one another. After the placement of a provided number of part portions, the completed food portion may be transported away from the stacking section and may, for example, be packaged so that the food products may also be processed into large food portions comprising a plurality of part portions by means of such a system.

To produce food portions that are as uniform as possible, a predetermined number of slices may be provided for each part portion and the slices may be cut off with a predefined thickness. However, in particular when processing natural products, changes in the composition of the product may occur over the length of the product in that, for example, a fat proportion or the dimensions of a piece of meat to be processed may vary over the length of the product. However, this may have the result that the weight of the cut-off slices also varies even though they are cut off with a constant thickness so that the weight of the part portions and the weight of the food portions formed from the part portions may also be subject to unwanted fluctuations. In particular if food portions of a clearly predefined weight are to be produced during the processing, subsequent checks and, if necessary, a manual addition or a removal of slices are therefore often necessary.

This problem in particular exists when processing the products into food portions that comprise a plurality of part portions. To be able to achieve an appropriate portion throughput when preparing such food portions despite the additional step of stacking the part portions compared to the direct production of comparatively small portions at the slicing apparatus, the part portions have to be produced following one another as directly as possible. However, this has the result that consecutive part portions have a very small spacing from one another so that the completed part portions may not be traveled over a so-called slicer checkweigher of the slicing apparatus with a sufficient spacing from one another to be able to determine the weight of individual part portions. Therefore, it is necessary to determine the weight of the food portions in a separate step and to make manual corrections without, for example, dynamic adaptations of the slicing process being possible in order to achieve a uniform and automatic formation of the part portions and the food portions with a predefined weight.

It is therefore an object of the invention to enable a checking of the weight of the part portions and/or of the food portions, and thus an improved process control, in a system for processing food products by means of which large food portions comprising a plurality of part portions formed by a slicing apparatus may be prepared.

This object is satisfied by a system having the features of the claimed embodiments.

The system comprises a transport device adjoining the portioning section and the portioning section comprises a conveying device that is configured to transfer the part portions to the transport device. The transport device is configured to transport the part portions received from the conveying device onto the product support of the stacking apparatus. Furthermore, provision is made in the system that the transport device and/or the stacking apparatus has/have a scale for measuring the weight of the part portions and/or of the food portion.

The transport device thus adjoins the portioning section with respect to a conveying direction along which the part portions are moved from the portioning section to the stacking apparatus. The transport device and the portioning section thus represent separate units within the meaning of the present disclosure in that the portioning section onto which the cut-off slices may fall is understood as part of the slicing apparatus, whereas sections onto which the part portions are subsequently moved between the portioning section and the stacking apparatus are understood as part of the transport device. The portioning section may comprise a conveying device to transfer the collected slices to a subsequent section that is associated with the transport device. For this purpose, the portioning section may, for example, comprise a continuously revolving conveyor belt on which the part portions may be formed and the slices cut off by the slicing apparatus may be placed. Such a conveyor belt may in particular also be movable during the formation of the part portions in order to place the slices in an overlapping manner on one another, for example. From this conveyor belt, the part portions may in particular be transferred to a further conveyor belt that is associated with the transport device so that the transition between the conveying device and the transport device may in particular be formed by a belt transition between a conveyor belt, onto which the cut-off slices fall, and a subsequent conveyor belt.

The transport device may, for example, also comprise one or more conveyor belts to transport the part portions taken over from the conveying device of the portioning section and/or a conveyor belt, on which the cut-off slices are placed, to the stacking apparatus and to move them onto the product support of the stacking apparatus. It is generally possible in this respect for the conveying device of the portioning section and the transport device to have a common drive or separate drives so that the portioning section and its conveying device, on the one hand, and the transport device, on the other hand, are in particular distinguished in that the slices are placed on the portioning section and the part portions are formed, whereas the transport device takes over the complete part portions and moves them to the stacking apparatus. However, this does not preclude, in particular in the case of long part portions, a front section of the part portion from already being moved onto a first section of the transport device while slices are still being added to the part portion.

Since the scale is arranged at the stacking apparatus and/or the transport device, the scale is thus arranged downstream of the portioning section with respect to the conveying direction, so that the weighing only takes place in a section in which the part portions are already present in complete form. The weight can thus be determined in a section in which, in particular not at a high speed, slices are added due to which the weight disposed thereon changes and due to which abnormal deflections in a measurement of the weight are generated at a high frequency, said deflections making a precise measurement more difficult. In this regard, a measurement of the weight of the part portions at the portioning section would at most be possible after a certain waiting time for the settling of the system, such waiting time, however, being not available in view of the required product throughput. Due to the provision of a scale arranged downstream, the part portions may, however, be transferred directly and without a waiting time to the transport device by means of the conveying device in order to only determine the weight downstream and under more constant conditions.

Furthermore, the part portions produced at a small spacing following one another at the slicing apparatus may, for example, be equalized by means of the transport device and their spacing from one another may be increased so that, after this equalization, the time available for measuring the weight of the part portions may be increased further and/or to a sufficient degree. This may, for example, take place by an intentional section-wise acceleration and/or deceleration of the part portions or the transport device may be configured to guide part portions via different transport paths to the stacking apparatus so that the spacing between part portions following one another at the transport paths may be increased with respect to the spacing of the part portions on the transfer from the portioning section to the transport device. Such transport paths may, for example, also be provided as buffer paths to be able to weigh the part portions, but thereafter to be able to join them together again and to perform the stacking of the part portions with the cycle predefined by the slicing apparatus and at a small spacing from one another. To also be able to determine the weight of the food portion, the directly measured weights of the part portions may, for example, be stored and/or added.

Provision may, for example, be made that the transport device comprises a distribution device to distribute the part portions to different transport paths. The individual transport paths may first diverge and then lead to the stacking apparatus so that the part portions received from the conveying device may in particular be distributed to a plurality of transport paths by means of the distribution device, but may ultimately all be guided to the stacking apparatus. Due to such a splitting, the spacing of the part portions from one another on the transport paths may in particular be increased compared to the spacing of the part portions taken over by the conveying device so that a weighing of the part portions at the transport paths may be made possible. For this purpose, a respective scale may in particular be arranged at the transport paths between the distribution device and the stacking apparatus. For example, provision may be made to distribute the part portions to two, three, or four transport paths by means of a distribution device in order to equalize the part portions and to enable a weighing at the transport paths. The distribution device may, for example, be configured as a rocker so that the transport paths may in particular extend above one another. For this purpose, the distribution device may in particular be pivotable about a horizontal axis. Alternatively thereto, the transport paths may, for example, extend laterally offset from one another and the distribution device may be configured to laterally distribute the part portions.

Furthermore, provision may be made that the distribution device is configured to sort out defective portions. For example, defective part portions may be identifiable by a visual inspection and may, for instance, comprise defectively cut slices. A distribution device configured as a rocker may in particular be configured to sort out a defective part portion by lowering it into a reject zone, for example, a reject container arranged beneath the rocker. The scale may consequently in particular be arranged behind such a distribution device, which is configured for sorting out defective part portions, with respect to a conveying direction along which the part portions are transported to the stacking apparatus.

Furthermore, as an alternative or in addition to a weighing at the transport device, provision may also be made to measure the weight of the part portions and/or of the food portion by means of the scale at the stacking apparatus to which the part portions are successively transferred. For example, the part portions are successively moved onto the product support of the stacking apparatus and are disposed there in a controlled and individual manner before the part portions are placed so that the weight of a part portion may be determined at the product support. Furthermore, the part portions are disposed completely on the stacking section after the placement so that a weight determination may also take place there. For this purpose, the total weight disposed on the stacking section may in particular be determined so that the weight of a respective last placed part portion may be determined as a change of this total weight. Here, too, a deflection of the scale after the placement of a part portion may indeed take place, but the time between consecutively placed portions is greater than the time between slices consecutively placed at the portioning section so that sufficient time for the measurement may be available. Furthermore, on a weighing at the stacking section, the total weight of the food portion may also be measured directly, wherein the total weight disposed on the stacking section may also be exclusively determined and/or evaluated as the weight of the food portion being formed.

In general, the weight of each part portion may be determined at the stacking apparatus and/or the transport device, wherein the weight of the food portion may be determined by adding the weight of the associated part portions and/or by a direct measurement at the stacking section. However, provision may also be made that only the weight of the complete food portion at the stacking section is determined by means of a scale arranged there and/or is considered for any process adaptations.

Since this arrangement of the scale downstream of the portioning section makes it possible to also determine the weight of part portions and/or food portions when preparing large food portions, this weight may in particular also be used when controlling the system. For example, by checking the weight of the part portions and/or of the food portion, it may be determined when current settings of the slicing apparatus result in too low a weight or too high a weight of the part portions so that ultimately the food portions formed also do not have the correct weight. This information may in particular be used to influence in a correcting manner a currently formed food portion and/or the formation of a subsequent food portion by adapting the settings of the slicing apparatus, the transport device, and/or the stacking apparatus. For example, the stacking apparatus may be controlled to automatically add a further part portion to a food portion that is already complete in accordance with the actual presettings when it is determined that the food portion has not reached a predefined weight. In this regard, corrections may take place automatically and promptly to be able to influence another currently formed food portion and to be able to reduce the requirement for subsequent or manual corrections. Furthermore, the measured weight may also be used to adapt the settings of the slicing apparatus, in particular automatically, in order, for example, to change a slice thickness and to be able to reach the correct weight for subsequent part portions and/or food portions. Alternatively to an automatic adaptation of the processing process, a message may also be sent to a user when the weight of the part portions and/or of the food portions does not correspond to a predefined desired weight so that the user may make adaptations of the settings himself, but without having to perform a manual check.

In general, provision may furthermore be made that the slicing apparatus also has a scale that may in particular be arranged at the portioning section. However, in the system described here, at least also a scale arranged downstream of the slicing apparatus and the portioning section, in particular a scale arranged downstream of a distribution device for distributing the part portions to a plurality of transport paths or a scale as part of the stacking apparatus, is always provided to be able to determine the weight of the part portions and/or of the food portion. The system may thereby, for example, be flexibly used to selectively produce only small portions which are formed directly on the portioning section and for which the stacking apparatus may be omitted, wherein, in such situations, a scale arranged at the portioning section may be used to measure the portion weight. In situations in which, in contrast, large food portions comprising a plurality of part portions are to be produced, the scale arranged downstream may be used.

Further embodiments can be seen from the dependent claims, the description, and the drawings.

The slicing apparatus of the system may in particular have a product feed by means of which the bar-shaped food products may be moved into the cutting region. Such a product feed may, for example, comprise one or more conveyor belts or product grippers that engage into a rear end of the food product and that advance the food product into the cutting plane. Furthermore, the slicing apparatus may be operable on one track or on multiple tracks, wherein, in the case of a multi-track slicing apparatus, a plurality of food products may be simultaneously moved into the cutting plane and slices may be cut off from the food products. The slicing apparatus may in particular comprise one or more blades, in particular one or more circular blades or scythe-like blades revolving in the cutting plane.

The slicing apparatus may further be configured to perform blank cuts to separate the part portions from one another, during which blank cuts the blade indeed performs a revolution, but no slice is cut off from the food product. For this purpose, a product feed may, for example, be interrupted and/or the blade may be briefly moved out of the cutting plane. To achieve a product throughput that is as high as possible, provision may, however, be made that a subsequent part portion is already being formed while the previously completed part portion is at least partly still located on the portioning section.

Provision may furthermore be made that the conveying device of the portioning section is permanently drivable or driven so that the slices of a part portion may be arranged offset and overlapping one another on the portioning section and the part portion may already be moved towards the transport device and/or the stacking apparatus while slices are still being added to the part portion. In particular with such long part portions that are moved during the addition of slices, the part portions may already be sectionally disposed on the transport device while slices are still being added to the part portion. Furthermore, the portioning section may be movable transversely to a conveying direction along which the part portions may be transported to the stacking apparatus to be able to place the slices in an overlapping manner or completely next to one another without overlapping.

Furthermore, the slicing apparatus may comprise a so-called interleaver by means of which a sheet or a film may be inserted below the part portions to be produced. This may in particular enable a customer to easily separate the part portions of a food portion from one another again. By means of such an interleaver, a film web may, for example, be inserted into the cutting plane before the cutting off or during the cutting off of a first slice of a part portion so that the blade may also cut off a sheet of this film web simultaneously with the first slice, said sheet then being placed together with the first slice and below the first slice. Alternatively or additionally, a so-called underleaver may also be provided at the transport device to be able to insert a sheet or a film below a transported part portion.

In some embodiments, the scale may be integrated into the stacking apparatus. In such embodiments, the stacking apparatus may thus so-to-say be configured as a unit with an integrated scale to be able to be selectively connected to a slicing apparatus and a transport device when the system is to be used for producing large food portions comprising a plurality of part portions provided by the slicing apparatus. In this respect, the scale of the stacking apparatus may in particular be connected and/or connectable to a control device of the system and/or of the slicing apparatus so that the measurement results of the scale may be considered in the process control and in particular in the control of the slicing process for producing the part portions.

In some embodiments, the stacking section may have the scale, wherein the scale may be configured to measure the weight of the part portions placed on the stacking section.

The stacking section may in particular comprise a conveyor belt on which the part portions are successively placed so that the completely formed food portion may be moved away from the stacking section and may, for example, be fed to further processing steps, in particular to a packaging machine. The scale may in particular be integrated into such a conveyor belt or a module that comprises the conveyor belt. The scale may, however, also be arranged at a support of the stacking section on the ground so that the weight of the stacking section, which changes as a result of a placement of a part portion, may be determinable by means of the scale. In this respect, the scale may be settable such that only the weight of the placed portions is output as a measurement value.

To determine the weight of the placed part portions, the scale may, for example, be configured to output a change in the measured weight as a measurement value so that the weight of a last placed part portion may be determined as the difference between a current weight on the stacking section and a weight measured before the placement of this part portion. However, provision may also be made that the scale is always zeroed after the outputting of a measurement value to be able to determine the weight of a subsequent part portion. The weight of the part portions may further in particular be stored so that the weight of the food portion comprising the part portions may be determined by adding these weights—if applicable, also during the formation of the food portion. However, the scale may also be configured to determine and/or to output a total weight of the part portions placed on the stacking section so that the weight of the food portion formed on the stacking section may be measured directly by means of the scale.

In some embodiments, the product support and/or the stacking section may be supportable on the ground via a frame, wherein the scale may be arranged beneath the product support and/or beneath the stacking section at the frame. The product support and the stacking section may in particular be supported on the ground via a common frame.

The product support and/or the stacking section may thus in particular be supported on the ground via the scale. In general, by means of a scale arranged in such a manner, the weight of the components of the stacking apparatus and of the frame that are arranged above the scale may be determined so that it may be registered when this weight increases by picking up a part portion on the product support and/or on the stacking section. Thus, for example by arranging the scale at a frame via which the product support is supported on the ground, the weight of a part portion that has been moved onto the product support may be determined, wherein, by adding the weight of the part portions successively moved onto the product support, the weight of a food portion formed from these part portions may furthermore be determined. By arranging the scale at a frame that supports the stacking section, the weight of the part portions successively placed on the stacking section and/or the weight of the food portion may likewise be measured, as explained above.

In some embodiments, the frame may have at least three support sections, in particular four support sections, via which the product support and/or the stacking section may be supported on the ground, wherein the scale may be arranged at at least one of the support sections. The scale may in particular comprise a plurality of load cells, wherein a respective load cell may be arranged at each of the support sections.

Thus, in such embodiments, the scale may be arranged in the region of one or more legs or feet of a frame or may be integrated into such legs and/or feet via which the product support and/or the stacking section is/are supported on the ground. Again, the weight of the product support and/or of the stacking section may thereby be determined and a change in the weight by picking up a part portion may be registered. By arranging a plurality of load cells, the weight of the part portions and/or of the food portions may in particular be determined via a plurality of measurement points in order, for example, to be able to determine and/or compensate any torques or tilt torques when the part portions are not centrally moved onto the product support and/or the stacking section.

In some embodiments, the stacking apparatus may have a drive for moving the product support, wherein the drive may be supportable on the ground via the scale. The scale may in particular be arranged such that the scale may measure the weight of the drive, of the product support, and of the part portions moved onto the product support in order thereby to ultimately be able to determine the weight of the part portions. The scale may in particular be zeroed for this purpose when only the drive and/or the product support is/are supported via the scale.

Furthermore, in some embodiments, the drive may comprise a motor and a shaft via which the product support is connected to the motor. The shaft may be supported at the stacking apparatus via at least one bearing and the scale may be arranged at the at least one bearing. The shaft may in particular be supported at the stacking apparatus via a plurality of bearings, wherein a respective load cell of the scale may be arranged at each of the bearings.

Due to the arrangement of the scale at the bearing, the weight of the shaft and of the product support associated therewith may be measured so that a weight change may also be detected when a part portion is moved onto the product support. Furthermore, in some embodiments, the motor may also be supported at the stacking apparatus via the bearings and the scale so that the total weight of the drive may act on the scale. The shaft and/or the motor may in particular be supported at a fixed frame of the stacking apparatus via the scale so that the motor and/or the shaft may ultimately be supported on the ground via the scale.

In such embodiments, the product support may in particular be movable from the feed position into the placement position by a rotation of the shaft, in particular by a rotation of the shaft about 90°. For this purpose, the part portions may, for example, be moved onto a horizontally oriented product support, wherein the product support may be transferred into a vertical orientation by a rotation of the shaft about 90° so that the part portions may slip off at the product support and may be placed on the stacking section. For this purpose, the product support may in particular be fastened to the shaft at an outer side.

In some embodiments, the stacking apparatus may further have two product supports that are fastened to a respective shaft at opposite outer sides and that jointly form a product support surface. In such embodiments, the product supports may be moved from a horizontal orientation into a vertical orientation and from the feed position into the placement position by a rotation of the shafts in opposite directions in order to place a part portion. In this respect, each of the shafts may in particular be supported at the stacking apparatus and may be supported at the stacking apparatus via at least one respective load cell of the scale. In general, a plurality of product supports, for example two, three, or four product supports, may furthermore be arranged at each of the shafts so that, by rotating the shafts about 90°, 120°, or about 180° for placing a part portion, respective product supports may again be brought into a horizontal orientation to form a product support surface and to be able to pick up a part portion.

In some embodiments, the transport device may have a first transport path and a second transport path and the transport device may comprise a distribution device that is configured to selectively distribute part portions received from the conveying device to the first transport path or the second transport path. As already explained, the part portions successively received from the conveying device of the portioning section may in particular be equalized by such a distribution to two transport paths and their spacing from one another on the transport paths may be increased to enable a weighing of the part portions. For example, provision may be made to alternately distribute the part portions to the first transport path and the second transport path.

In some embodiments, the first transport path and the second transport path may act as buffer paths, wherein the part portions may in particular be separated by means of the distribution device and may be distributed to the first transport path and the second transport path to be able to be joined together again to form a food portion at or in front of the stacking apparatus. In this respect, the weighing of the part portions may in particular take place at the first transport path and at the second transport path at which the part portions may have a spacing from one another that is sufficient for this purpose. Alternatively thereto, provision may, however, also be made to feed the part portions via the first transport path and the second transport path to respective stacking apparatuses, as explained further below.

The two transport paths may, for example, be formed by respective conveyor belts that may extend laterally offset from one another and/or above one another. To be able to selectively distribute the part portions to a first transport path, which at least sectionally extends above the second transport path, or to the second transport path, the distribution device may in particular comprise a rocker pivotable about a horizontal axis, in particular a pivotable conveyor belt, or a conveyor belt that may be raised and lowered. Alternatively thereto, the distribution device may be configured to distribute the part portions to transport paths laterally offset from one another, for which purpose the distribution device or a conveyor belt of the transport device may, for example, be pivotable about a vertical axis. Furthermore, the distribution device and/or a conveyor belt of the transport device may be laterally displaceable in order, for instance, to laterally distribute part portions that are centrally taken over. The distribution device may furthermore comprise a plate conveyor by means of which the part portions may be horizontally distributable.

Provision may in particular be made to alternately distribute the part portions to the first transport path and the second transport path.

Furthermore, further process steps may also take place at the first transport path and the second transport path in that, for example, a respective bottom layer may be added at the transport paths below the individual part portions by a so-called underleaver. More time may generally also be available for such process steps by splitting the part portions between the transport paths and access to the individual part portions for carrying out the process steps, in particular access for the necessary machines, may also be facilitated.

Furthermore, the distribution device may generally also be configured to distribute the part portions to more than two transport paths, for example three, four, five, or six transport paths, which the transport device may comprise. In this respect, the transport paths may, for example, be joined together pair-wise and the respective part portions may be fed to a common stacking apparatus or provision may be made that all the transport paths lead to a separate stacking apparatus. It is likewise possible that all the transport paths lead to the same stacking apparatus.

In some embodiments, the system may have a first scale and a second scale, wherein the first scale may be arranged at the first transport path and the second scale may be arranged at the second transport path. In this respect, the first scale and the second scale may in particular be arranged between the distribution device and the stacking apparatus.

As already explained, due to the distribution of the part portions to the first transport path and the second transport path, the spacing between the part portions from one another may be increased so that a weighing of the part portions at the transport paths may be made possible. In such embodiments, the circumstance may thus in particular be used that the spacing between part portions following one another at the transport paths may be increased with respect to a spacing of the part portions successively transferred from the conveying device of the portioning section to the transport device by the splitting between two transport paths so that a determination of the weight of the part portions at the transport paths is made possible. In this respect, the first scale and the second scale may in particular be associated with a respective conveyor belt that forms a part of the first transport path or the second transport path. The weight of the part portions may in this respect be determined while the part portions are moved via the conveyor belt or provision may be made to briefly stop the conveyor belt. Such a stopping may also in particular be made possible in that the spacing between the part portions may be increased by the distribution to two transport paths and the time required for the weighing may thus be gained. Furthermore, already existing modules of conveyor belts with integrated scales may be comfortably used at the transport paths to determine the weight of the part portions moved to the respective stacking apparatuses. In the case of more than two transport paths, each of the transport paths may in particular be associated with a respective scale.

In some embodiments, the system may have a first stacking apparatus and a second stacking apparatus, wherein the transport device may be configured to move the part portions via the first transport path onto the product support of the first stacking apparatus and via the second transport path onto the product support of the second stacking apparatus.

Due to such a distribution of the part portions to two separate transport paths, the spacing between the part portions transported on the respective transport paths may in particular be increased with respect to the spacing of the part portions consecutively transferred from the portioning section to the transport device so that the time available at the transport paths and/or at the stacking apparatuses for weighing the part portions may also be increased. In this respect, a respective scale may in particular be provided at the first transport path and the second transport path and/or a respective scale may be provided at the first stacking apparatus and the second stacking apparatus. Furthermore, by distributing the food portions to two stacking apparatuses, the product throughput may possibly also be increased in that, for example, the slicing process and the production of the part portions do not have to be adapted to a possibly slower stacking process at the stacking apparatuses, but the part portions may be produced with a maximum cutting speed and a small spacing from one another.

In some embodiments, the first stacking apparatus and the second stacking apparatus may have a respective scale. In such embodiments, the measurement of the weight of the part portions and/or of the food portions may thus, as already explained, take place at the stacking apparatuses, wherein the respective measurement results may in particular be made available to a control of the slicing apparatus and/or of the system.

In some embodiments, the system may have a first scale and a second scale, wherein the first scale may be arranged between the distribution device and the first stacking apparatus and the second scale may be arranged between the distribution device and the second stacking apparatus. The first scale may in particular be integrated into the first transport path and the second scale may be integrated into the second transport path.

In some embodiments, the system may have a control device that is configured to adapt the operation of the system, in particular settings of the slicing apparatus and/or of the transport device, in dependence on a measurement result of the scale.

For example, the control device may be configured to accelerate the transport device when a further part portion has to be fed to a food portion in order to achieve a predefined desired food portion weight so that the further part portion may be provided as quickly as possible. Furthermore, the control device may be configured to adapt the number of slices that form a part portion in dependence on the measurement result of the scale in order, for example, to increase the number of slices when it is determined that the weight of the part portions is systematically too low. Alternatively or additionally, provision may be made to change a thickness of the slices cut off by the slicing apparatus and thereby to influence the weight of the part portions and/or of the food portions. This may in particular be provided when a certain number of slices per part portion and/or a certain number of slices per food portion is/are fixedly predefined so that the weight of the food portion may not be influenced either by adapting the number of slices per part portion or by adding a further part portion. To adapt the thickness of the slices, a speed of a product feed of the slicing apparatus, which guides the food products into the cutting plane, and/or a speed of the blade movement may in particular be adapted.

In some embodiments, the control device may be configured to adapt the number of slices of a part portion and/or a thickness of the cut-off slices in dependence on the measurement result of the scale. Due to such adaptations, as explained above, the weight of subsequently formed part portions may in particular be influenced when deviations from a desired weight are determined in one or more previously produced part portions.

In some embodiments, the control device may be configured to perform a regulation in which the number of slices of a part portion or the thickness of the slices is the control variable and the weight of the part portions and/or of the food portion measured by means of the scale is the regulation variable.

In such a regulation, the weight of the part portions and/or of the food portion may be determined by means of the scale and may be fed back in a control loop, wherein the control device may compare the measured weight of the part portions and/or of the food portion with a respective desired weight. If there is a deviation between the desired weight and the measured weight, the control device may perform an adaptation of the number of slices of a part portion or of the thickness of the cut-off slices in order thereby to influence the weight of the subsequently produced part portions. After this adaptation, the weight of the part portion and/or of the subsequent food portion may again be determined by means of the scale to be able to make a further adaptation if the wanted desired weight has not been reached despite the adaptation made. Such a regulation thus makes it possible to continuously and flexibly correct incorrect settings and to dynamically adapt settings of the system in order, for example, to be able to react to changing product compositions, for instance a fat proportion of the food product varying over the product length, and to be able to produce food portions of a predefined desired food portion weight throughout the entire slicing process.

In some embodiments, the control device may be configured to perform a trend regulation on the basis of the weight of a plurality of consecutive part portions and/or food portions.

In such a trend regulation, adaptations of settings of the system may in particular not take place after each measurement of the weight in which a deviation from a desired weight is determined, but minor and/or statistically distributed deviations may rather be accepted. Within the framework of a trend regulation, it may rather be checked whether the measured weight of consecutive part portions and/or of consecutively produced food portions is systematically lower or higher than a predefined desired weight in order to make an adaptation only when such a systematic deviation is determined. It may thereby in particular be prevented that merely statistically induced weight deviations are reacted to and fundamentally correct settings are thereby changed incorrectly such that any subsequent deviation, which is again statistically induced, is amplified further.

In some embodiments, the slicing apparatus may comprise an optical scale that is configured to determine a surface structure and a contour of a front product end facing the cutting plane. In such embodiments, the control device may be configured to determine a desired thickness of the slice to be cut off based on the determined density and the contour, at which desired thickness the cut-off slice has a predefined desired weight.

The control device may in particular be configured to determine a density of a slice to be cut off from the front product end based on the determined surface structure, to determine a desired thickness of the slice to be cut off based on the determined density and the determined contour, at which desired thickness the cut-off slice has a predefined desired weight, and to control the slicing apparatus to cut off the slice with the desired thickness. The control device may further be configured to adapt the determination of the density and/or of the desired thickness in the event of a deviation of the measurement of the scale from a desired part portion weight and/or from a desired food portion weight determined by the number of slices.

For example, the optical scale may comprise a camera to generate an image of the front product end. This image may be provided to the control device and the control device may be configured to analyze the surface structure of the front product end based on the image in order, for example, to be able to identify fat proportions, meat proportions, and/or bone proportions at the surface of the front product end. For this purpose, the control device may, for example, be configured to perform an image analysis process.

Furthermore, the control device may be configured to determine a density at the front product end based on the determined surface structure, in particular the determined fat proportions, meat proportions, and/or bone proportions. For this purpose, the control device may, for example, make use of stored density values for the respective proportions in order to determine an average density at the front product end considering the areas or area portions which the respective proportions occupy. When considering this average density and the determined contour of the front product end, which may in particular describe an outer margin of the product end, the control device may then determine the thickness of a slice to be cut off at which the cut-off slice has a predefined desired weight. For this purpose, the control device may also be configured to determine an area of the front product end based on the contour.

Such an optical scale in particular makes it possible to consider deviations of the density of the product over its length in the slice thickness and thereby also to produce slices with the predefined weight, and accordingly to produce part portions with a predefined desired part portion weight, in the case of a product composition that, for instance, changes over the length of the product, in particular in the case of changing fat proportions, meat proportions, and/or bone proportions. Thus, the thickness of the slice may, for example, be increased in the case of an increased fat proportion to be able to cut off a slice of the predefined desired weight despite the correspondingly reduced density.

Whereas deviations in the structure of the processed products may be considered with such an optical scale, the determination of the desired thickness may be improved even further in that the scale for measuring the weight of the part portions and/or of the food portion is so-to-say used as a checkweigher for the optical scale and the weight of the part portions that is predicted by means of the optical scale by the control device and that may in particular correspond to the desired part portion weight and/or the predicted desired food portion weight is/are compared with the actual weight of the part portions and/or of the food portion. Consequently, such a check may make it possible to adapt the optical scale and/or the steps for determining the desired thickness when the part portions and/or the food portion do/does not have the expected weight.

To make such an adaptation, the control device may, for example, be configured to adapt density values stored in a memory in dependence on a measurement of the scale, with the density of the front product end and/or the desired thickness of the slice being determined based on said density values. Furthermore, provision may be made to adapt an association rule for associating slice thicknesses with determined densities when the optical scale systematically determines too small a weight or too large a weight of the part portions and accordingly defines slice thicknesses that are too small or too large. Furthermore, a correction factor may also be introduced in the determination of the density so that individual stored density values may not be adapted directly, but a determined average density and/or the stored density values may rather be multiplied by a correction factor. Such a correction factor may in particular correspond to the ratio of the expected weight of the part portions and/or of the food portion and the weight of the part portions and/or of the food portion measured by means of the scale.

Alternatively to the above-explained determination of an average density of the front product end, provision may also be made that the control device is configured to determine sections in the surface structure and their area portion or the area which the respective portion occupies. For example, the control device may be configured to identify a fat proportion, a meat proportion, and/or a bone proportion in the surface structure and to determine a respective associated area which is occupied by the proportions. To determine the desired thickness of the slice to be cut off, the control device may be configured to determine a respective section density for each of the sections and to determine the desired thickness based on the area portions of the sections and the section densities as that thickness at which a slice assembled by the sections has a predefined desired weight. Here, too, in particular the stored section densities, for example stored densities for fat, meat and/or bones, may be changed or a correction factor may be introduced in order to adapt the determination of the desired thickness.

In some embodiments, the control device may be configured to determine a fat proportion, a meat proportion, and/or a bone proportion within the contour of the front product end based on the surface structure and to calculate the density and/or the desired thickness of the slice to be cut off from the front product end in dependence on the respective proportion and/or the respective proportions and/or to look up the density and/or the desired thickness of the slice to be cut off from the front product end in a look-up table.

For example, the system may comprise a memory, in particular a semiconductor memory, having a look-up table in which respective proportions or combinations of proportions are associated with a respective density and/or a desired thickness of the slice. However, provision may also be made that each of the proportions is associated with a respective density so that the control device may calculate the average density at the product end and/or the desired thickness of the slice to be cut off. Furthermore, the control device may be configured to determine a respective area of a fat proportion, of a meat proportion, and/or of a bone proportion based on the surface structure in order to determine the desired thickness by a multiplication of the respective areas by section densities stored for the proportions and by a comparison with the desired weight for the slice.

In some embodiments, the control device may be configured to adapt parameters for calculating the density and/or the look-up table in dependence on the measurement of the scale. For example, stored density values for individual sections or proportions of the surface structure, for example a fat proportion, a meat proportion, and/or a bone proportion, may be adapted in dependence on the measurement of the scale. If it is, for example, determined that the density is systematically too large, in particular for a surface structure having a large meat proportion, and the slice thickness is correspondingly determined as too small so that the part portions have too low a weight, the stored density value for a meat proportion may be increased to achieve a more accurate determination of the required desired thickness. For this purpose, the control device may, for example, be configured to correlate systematic deviations from the desired part portion weight and/or the desired food portion weight with certain proportions or proportion ratios in order to draw conclusions therefrom about the incorrectly determined density value.

In some embodiments, the control device may be configured to execute a self-learning algorithm for determining the density of the slice to be cut off from the front product end and/or the desired thickness and to optimize said self-learning algorithm considering the measurement of the scale. The control device may in particular predict a weight of the part portions and/or of the food portion based on the surface structure, the determined density, and the desired thickness, wherein this predicted weight may be compared with the weight actually measured by the scale in order thereby to train and to optimize the self-learning algorithm. In general, such a self-learning algorithm may also make it possible to determine the desired thickness of the slice to be cut off from the front product end without making use of stored density values and without an explicit determination of a density in that, for example, certain parameters may be determined by an image provided by the optical scale and a desired thickness for a desired slice weight may be output by the self-learning algorithm, for example, a neural network. Based on the measurement result of the scale, it may then be checked whether the part portions of the slices cut with the desired thickness also have the predefined desired part portion weight and deviations may be reported back in order to continuously optimize the algorithm. In this respect, the training of the algorithm may in particular already take place at the factory so that the desired thickness of the products to be sliced may be reliably determined in the delivered system, wherein measurement results of the scale may, however, continue to be used for optimizing the algorithm and/or for process monitoring.

In some embodiments, the control device may comprise a microprocessor and/or a CPU (central processing unit). Furthermore, in some embodiments, the control device may be of a modular design so that different tasks of the control device that are described herein may, for example, be performed by different units and/or microprocessors that may in particular also be arranged spatially separately. However, the control device may also be configured as a central unit so that, for example, all the components of the control device may be arranged in a common housing.

In some embodiments, a predetermined number of part portions may be provided for the food portions, wherein the control device may be configured to control the stacking apparatus to add a further part portion after the placement of the predetermined number of part portions when the weight of the predetermined number of part portions measured by the scale is less than a desired food portion weight provided for the food portions. Alternatively or additionally, in some embodiments, the system may comprise a marking and/or signaling device, wherein the control device may be configured to control the marking and/or signaling device, in the event of a deviation of the weight of the predetermined number of part portions measured by the scale from the desired food portion weight, to mark the food portions and/or to trigger a signal perceptible to a user.

Provision may in particular be made to automatically add a further part portion when it is determined that the desired food portion weight has not yet been reached after the placement of the predetermined number of part portions on the stacking section. The weight of the food portion may thus be intentionally increased before the food portion is removed from the stacking section and is fed to further processing steps, in particular to a packaging machine, so that in particular a subsequent manual addition of slices may be prevented and the control effort may also be reduced. Alternatively thereto, the system may mark an underweight food portion or may generate a signal perceptible to a user by means of the marking and/or signaling device in order to alert the user that slices still have to be added to the respective food portion. A marking or a signal output, for example of an acoustically and/or optically perceivable signal, may also take place when the weight of the predetermined number of part portions is greater than the desired food portion weight so that the user may remove one or more slices.

In some embodiments, the control device may be configured, when the weight of the predetermined number of part portions measured by means of the scale is less than a desired food portion weight provided for the food portions, either to control the stacking apparatus to add a further part portion or to control the marking and/or signaling device to mark the food portion and/or to trigger the signal perceptible to a user in dependence on a difference between the weight measured by the scale and the desired food portion weight.

For example, provision may be made to automatically add a further part portion to the predetermined number of part portions when the weight of the predetermined number of part portions is considerably less than the desired food portion weight and, for example, approximately corresponds to the weight of a part portion so that the desired food portion weight is not exceeded or is at least not considerably exceeded by the addition of a complete further part portion. However, if the difference between the desired food portion weight and the weight of the predetermined number of part portions is small, a marking or a signal triggering may take place so that the user may add or remove individual slices. The production of considerably overweight food portions may hereby in particular be prevented and as great as possible an automation may nevertheless be achieved.

In some embodiments, a minimum difference at which the control device controls the stacking apparatus to add a further part portion may be settable via an input device, in particular a touch screen, of the control device.

For example, by setting the minimum difference, a still acceptable excess weight of a food portion may ultimately be definable via the input device so that a further part portion may be automatically added when the weight of the food portion falls below the defined acceptable excess weight even after the addition of the further part portion. Furthermore, in particular the weight of the further part portion to be potentially added and the weight of the predetermined number of part portions may be determinable by means of the scale so that the control device may also be configured to prevent the addition of a further part portion when the latter has too great a weight and would exceed the acceptable excess weight in order to perform a marking or to trigger a signal instead. The user may in particular also decide to always add a part portion when the weight of the predetermined number of part portions is less than the desired food portion weight in order to achieve a complete automation and to ensure that no underweight food portions are produced. This may in particular be provided when the pricing of the food portions takes place in dependence on weight, but may or should not fall below a minimum weight, in particular the desired food portion weight, or a minimum number of part portions or slices. Furthermore, by setting the minimum difference, an adaptation to different products or requirements for the accuracy of the weight of the food portions produced may also take place.

In some embodiments, the stacking apparatus may comprise a measurement device for determining a height of part portions placed on the stacking section and the system may comprise a sorting-out device. In such embodiments, the control device may be configured to control the sorting-out device to sort out the placed part portions when the determined height exceeds a predefined or predefinable maximum height and the measured weight of the placed part portions falls below a desired food portion weight.

For example, provision may be made to package the food portions in a subsequent processing step, wherein a maximum height for food portions that may be received in the packaging may be predefined by the packaging. If this maximum height is already reached on the stacking section, but the weight of the placed part portions falls below the desired food portion weight, the desired food portion weight consequently may not be reached without the maximum height being exceeded. In this regard, the part portions placed on the stacking section may be classified as unsuitable in order to produce a proper food portion. The placed part portions may therefore not be used for the further processing steps so that the control device may control the sorting-out device to automatically sort out the placed part portions in order in particular to prevent disturbances of the packaging process. The measurement device may, for example, comprise a distance sensor to be able to determine the height of the placed part portions by the spacing between the distance sensor and the uppermost placed slice.

For the sorting out, provision may, for example, be made that the stacking section comprises a drivable conveyor belt, wherein the part portions to be sorted out may be moved against a conveying direction along which complete food portions are fed to further processing steps in order, for instance, to move the part portions into a reject container. However, provision may also be made that the system comprises a distribution device adjoining the stacking apparatus to distribute food portions to be further processed, on the one hand, and part portions not to be used, on the other hand, to different tracks.

In some embodiments, the control device may be configured to adapt a cutting speed of the slicing apparatus and/or a transport speed of the transport device in dependence on the measurement of the scale during the formation of a food portion.

Provision may in particular be made to increase a cutting speed of the slicing apparatus and/or a transport speed of the transport device when it is already recognized during the formation of a food portion that a further part portion provisionally has to be added in order to reach the desired food portion weight. By accelerating the slicing apparatus and/or the transport device, it may be achieved in such cases that the further part portion reaches the stacking apparatus earlier and that the total time required for forming the food portion with the further part portion may be reduced in order, for example, not to impair a cycle of further processing steps following the formation of the food portion and, where possible, to be able to completely form the food portion in a time predefined by this cycle. After the completion of such a food portion with a further part portion, the cutting speed of the slicing apparatus and/or the transport speed of the transport device may, however, be slowed down again to an intended speed.

In some embodiments, the system may comprise at least a first stacking apparatus and a second stacking apparatus as well as a first scale for determining the weight of the part portions moved to the first stacking apparatus and/or the weight of the food portion formed at the first stacking apparatus and a second scale for determining the weight of the part portions moved to the second stacking apparatus and/or the weight of the food portion formed at the second stacking apparatus. Furthermore, the transport device may have a distribution device for selectively distributing part portions to the first stacking apparatus or to the second stacking apparatus, wherein the control device may be configured to control the distribution device in dependence on measurements of the first scale and the second scale.

In some embodiments, the control device may in particular be configured to control the distribution device and/or the slicing apparatus such that differences between a respective total weight of the part portions moved to the first stacking apparatus and to the second stacking apparatus may be compensated.

As already explained, the product throughput may, for example, be increased by a system comprising two stacking apparatuses in that the slicing speed of the slicing apparatus and the formation of the part portions in particular do not have to be adapted to possibly slower stacking processes. However, to achieve a uniform processing at both stacking apparatuses, the respective total weight of the part portions processed at the stacking apparatuses may be determined. For this purpose, provision may, for example, be made to intentionally increase a slice thickness of slices that are guided to one of the first or the second stacking apparatus at which a lower total weight has been processed in order to intentionally process overweight part portions, in particular slightly overweight part portions, at this stacking apparatus at times. In particular with a known distribution scheme and, for example, with an alternating distribution of the part portions to the two stacking apparatuses, every second part portion may intentionally be sliced slightly overweight to obtain a uniform accumulated weight per stacking apparatus. In general, provision may, however, also be made to move more part portions to the first stacking apparatus or the second stacking apparatus at times by a corresponding control of the distribution device when a lower total weight of part portions has been processed at one of the stacking apparatuses.

In some embodiments, the scale may have one load cell or a plurality of load cells. Thus, the weight of the part portions and/or of the food portion may in particular be measured at one measurement point or at a plurality of measurement points. On a determination of the weight at the transport device and/or at the stacking section, a plurality of load cells may, for example, also be arranged at a conveyor belt to be able to determine the weight of a part portion moved via this conveyor belt or placed on this conveyor belt at a plurality of measurement points and to be able to compensate any torques or tilt torques.

In some embodiments, the stacking section may comprise a continuously revolving conveyor belt that may be driven by means of a drive. For example, the food portions formed on the stacking section may be movable away from the stacking section by driving the conveyor belt to be able to be fed to subsequent processing steps and in particular to a packaging machine.

In some embodiments, the system may comprise a further transport device and a packaging machine, in particular a deep-draw packaging machine, wherein the food portions may be transferrable to the further transport device and the further transport device may be configured to transport the food portions to the packaging machine. The further transport device may in particular be configured to feed the food portions to packages or package components movable by the packaging machine and in particular to place the food portions into or onto packages or package components movable by the packaging machine.

By means of such a system, a complete processing of the food products may thus take place by cutting the food products into slices by means of the slicing apparatus and by producing part portions from one or more slices, by transferring the part portions from the conveying device to the transport device, and by moving them from the transport device onto the product support of the stacking apparatus in order to be placed on the stacking section and to form a food portion from a plurality of part portions. The food portion may then be transferred, in particular from a continuously revolving conveyor belt of the stacking section, to the further transport device and may be transported to the packaging machine to be placed into packages or package components so that ultimately a completely packaged food portion may be provided.

The invention further relates to a stacking apparatus, in particular for use in a system of the kind described herein, that has at least one product support movable between a feed position and a placement position and a stacking section arranged beneath the product support and that is configured to place part portions, which have been moved onto the product support and which comprise at least one slice cut off by means of a slicing apparatus from a food product, in particular a meat product, sausage, cheese, ham and/or bacon, on the stacking section by moving the product support from the feed position into the placement position and to form a food portion comprising a plurality of part portions on the stacking section, in particular by stacking the plurality of part portions on top of one another. The stacking apparatus in this respect has a scale for determining the weight of the part portions and/or of the food portion.

As already explained, such a stacking apparatus having an integrated scale in particular makes it possible to determine the weight of the part portions and/or of the food portion so that this weight may be used or considered in a control of a system for processing food products. A stacking apparatus having an integrated scale may thus form a unit that may be selectively and flexibly inserted into such a system to enable an extended process control and/or process monitoring.

In some embodiments, the stacking section may have the scale, wherein the scale may be configured to determine the weight of the part portions placed on the stacking section. The scale may in particular also be configured to determine the weight of the food portion formed on the stacking section. As already explained, both the weight of the individual part portions and the weight of the food portion produced may generally be directly determinable by means of the scale.

In some embodiments, the product support and/or the stacking section may be supportable on the ground via a frame, in particular via a common frame, wherein the scale may be arranged beneath the product support and/or beneath the stacking section at the frame. The frame may thus be partly supported on the ground via the scale so that the scale may measure the weight of this part of the frame and of the components arranged above the scale and may determine when the weight increases by picking up a part portion.

In some embodiments, the frame may have at least three support sections, in particular four support sections, via which the product support and/or the stacking section may be supported on the ground, wherein the scale may be arranged at at least one of the support sections. The scale may in particular comprise a plurality of load cells, wherein a respective load cell may be arranged at each of the support sections. The support sections may in particular be respective legs or feet of the frame, wherein each of the support sections may be associated with a respective load cell and the weight of the part portions and/or of the food portion may be determinable based on the measurement results of the plurality of load cells.

In some embodiments, the stacking apparatus may have a drive for moving the product support, wherein the drive may comprise a motor and a shaft at which the product support is arranged. The product support may be movable from the feed position into the placement position by rotating the shaft. Provision may in particular be made to transfer the product support from a horizontal orientation into a vertical orientation by rotating the shaft about 90° in order to place a part portion picked up in the horizontal orientation on the stacking section. For this purpose, the product support may be fastened to the shaft at an outer side.

In some embodiments, the shaft may be connected to a motor shaft of the motor via a friction clutch.

Since the motor shaft of the motor may be connected via a friction clutch to the shaft at which the product support is arranged, a rotation of the motor shaft may be transmitted by friction to the shaft. Due to such a friction clutch, a maximum torque that may be transmitted to the shaft and the product support by means of the motor may thus in particular also be definable in that the shaft may so-to-say slip through with respect to the motor shaft when the rotation of the shaft is opposed by a torque that exceeds the torque that may be transmitted from the motor shaft to the shaft by the friction. The shaft may thus block and stop even though the motor shaft continues to rotate. Due to this slipping through of the shaft, such a friction clutch may also be designated as a slip clutch.

The configuration of the stacking apparatus with such a shaft connected to the motor shaft via a friction clutch may in particular increase the safety of the stacking apparatus in that the torque transmittable to the product support may be set and limited. It may hereby, for example, be prevented that, when a user reaches into the stacking apparatus, large forces are transmitted via the product support and the user may be injured. Rather, in the case of such a reaching, a further rotation may be prevented in that the user blocks the product support and the rotation of the shaft so that the shaft slips through with respect to the motor shaft and stops despite the further rotation of the motor shaft.

Therefore, such a friction clutch also makes it possible to omit otherwise necessary safety precautions for protecting a user possibly reaching into the stacking apparatus during the operation. With conventional stacking apparatuses, it is in particular necessary to provide a comparatively large enclosure so that a user may not reach into the region of the product supports at all in order to meet predefined safety standards. Whereas injuries to the user may thereby also be reliably prevented, these enclosures in particular also have to be removed for maintenance and/or cleaning purposes so that such processes are comparatively time-consuming and cumbersome. Due to the provision of a friction clutch between the shaft and the motor shaft, the safety standards may, however, be met without a reaching during the operation necessarily having to be prevented and having to be prevented by corresponding enclosures so that the enclosure may be omitted or the enclosure may at least be reduced in size. Access to the product supports may thereby in particular be facilitated so that in particular the cleaning processes frequently required in the food processing may be performed in an accelerated manner and operating interruptions may be reduced.

In view of the possibilities, by providing a friction clutch, of increasing the safety of the stacking apparatus and/or omitting further safety precautions and thereby facilitating maintenance or cleaning work, the invention also relates—independently of a stacking apparatus having an integrated scale—to a stacking apparatus for producing food portions that has at least one product support movable between a feed position and a placement position and a stacking section arranged beneath the product support and that is configured to place part portions, which have been moved onto the product support and which comprise at least one slice cut off by means of a slicing apparatus from a food product, in particular a meat product, sausage, cheese, ham and/or bacon, on the stacking section by moving the product support from the feed position into the placement position and to form a food portion comprising a plurality of part portions on the stacking section, in particular by stacking the plurality of part portions on top of one another, wherein the stacking apparatus has a drive for moving the product support, said drive having a motor and a shaft, wherein the product support is arranged at the shaft and may be moved from the feed position into the placement position by rotating the shaft and wherein the shaft is connected to a motor shaft of the motor via a friction clutch.

In some embodiments of the stacking apparatus, in particular having an integrated scale, the stacking apparatus may comprise at least a first product support and a second product support that form a common product support surface for the part portions. In this respect, the first product support and the second product support may be connected to a respective shaft at mutually opposite outer sides, wherein the first product support and the second product support may be pivotable from the feed position into the placement position by a rotation of the shafts in opposite directions, and wherein the drive may have a common motor for driving the shafts.

The drive may in particular comprise both shafts. Due to the driving of the two shafts via a common motor, a synchronization of the shafts may be achieved, for which purpose the two shafts may, for example, be connected by a chain or belt so that a drive transmitted to one of the shafts may be transmittable via the belt to the other shaft. Furthermore, such a connection of the shafts via a chain or belt also makes it possible to stop the shafts synchronously when one of the shafts is connected to a motor shaft of the motor via a friction clutch and too large a torque would have to be transmitted at one of the shafts in order to move the respective product support further. In this regard, on a blocking of one of the product supports, both shafts may be stopped synchronously so that after the blockage has been removed, both shafts may continue to be moved synchronized or with product supports arranged in corresponding rotational positions.

Such a configuration of the stacking apparatus with a first product support and a second product support and/or with a friction clutch may also be provided in a stacking apparatus described above in connection with a system for processing food products.

In some embodiments, the drive and product support may be supported on the ground via the scale. The scale may thus measure the weight of the drive, of the product support, and of the part portions moved onto the product support in order thereby to determine the weight of the part portions and/or of the food portion.

Furthermore, in some embodiments, the shaft may be supported at the stacking apparatus via at least one bearing, wherein the scale may be arranged at the at least one bearing. The shaft or a plurality of shafts may in particular be supported at the stacking apparatus via a plurality of respective bearings, wherein a load cell may be arranged at at least one of the bearings, in particular at each of the bearings. Provision may also be made that the motor is also supported at the stacking apparatus via the bearing or the bearings and thus via the scale.

The invention further relates to a method of operating a system for processing food products, in particular meat products, sausage, cheese, ham and/or bacon, in particular a method of operating a system of the kind disclosed herein. In this method, bar-shaped food products are guided into a cutting plane of a slicing apparatus and slices are cut off from the food product by means of a blade movable in the cutting plane. Furthermore, part portions that comprise one or more cut-off slices are formed on a portioning section of the slicing apparatus. The part portions are transferred from a conveying device of the portioning section, in particular from a conveyor belt, to a transport device and are moved onto a product support of a stacking apparatus by means of the transport device, wherein the part portions successively transported onto the product support are placed on a stacking section of the stacking apparatus and a food portion is formed that comprises a plurality of part portions. Furthermore, the weight of the part portions and/or of the food portion is measured at the transport device and/or the stacking apparatus.

As already explained, also in the case of such an assembly of large food portions from a plurality of part portions, such a weighing of the part portions and/or of the food portion downstream of the portioning section and the slicing apparatus makes it possible to consider the weight of the part portions and/or of the food portion in the control of the system and in particular of the slicing apparatus, whereas a measurement directly at the portioning section is usually not possible. For this purpose, the scale may in particular be arranged at the transport device arranged downstream of the portioning section and/or at the stacking apparatus, as explained above.

In some embodiments, a thickness of the cut-off slices and/or a number of slices of a part portion may be adapted in dependence on the measured weight of the part portions and/or of the food portion. The thickness of the cut-off slices may in particular be increased when the measured weight of the part portions is less than a desired part portion weight and the thickness may be decreased when the weight is greater than the desired part portion weight.

Furthermore, in some embodiments, a regulation may be performed in which the weight of the part portions and/or of the food portion is the regulation variable and the thickness of the slices and/or the number of slices of a part portion is the control variable. The weight of the part portions and/or of the food portion may thus be repeatedly measured and may be compared in a control loop with a desired weight to be able to continuously adapt and optimize the processing process and in particular the slicing of the food products.

In some embodiments, a predetermined number of part portions may be provided for the food portion, wherein a further part portion may automatically be added to the predetermined number of part portions placed on the stacking section when the measured weight of the predetermined number of part portions falls below a desired food portion weight. Alternatively or additionally, the food portion may be marked when the measured weight of the predetermined number of part portions falls below the desired food portion weight. As already explained, by automatically adding a further part portion, it may be prevented that manual checks of the food portions and, if applicable, a manual addition of slices or part portions are required. By marking a food portion, it may furthermore be directly indicated to a user when further slices or food portions have to be added or slices should be removed. Provision may also be made that the user is informed by a visually and/or acoustically perceivable signal that the desired food portion weight has not been reached.

In this respect, provision may in particular be made that, in dependence on a difference between the weight of the predetermined number of part portions and the desired food portion weight, a further part portion is added and/or a marking of the food portion takes place. For example, a complete further part portion may only be added when the difference is great in order to prevent the production of greatly overweight food portions. A minimum difference at which a further part portion is still added may further be settable by a user.

In some embodiments, a height of the part portions placed on the stacking section may be determined, wherein the food portion formed by the placed part portions may be sorted out when the determined height exceeds a predefined maximum height and the measured weight of the food portion falls below a desired food portion weight. Food portions that already have too great a height for placement into a packaging, but too low a weight may thereby in particular be sorted out.

The further measures that were described above in connection with the control device of the system for processing food products may also be performed as method steps in this method. Provision may in particular also be made in the method to control and/or to set an optical scale of the slicing apparatus by the measured weight of the part portions and/or of the food portions.

Figure 1B:
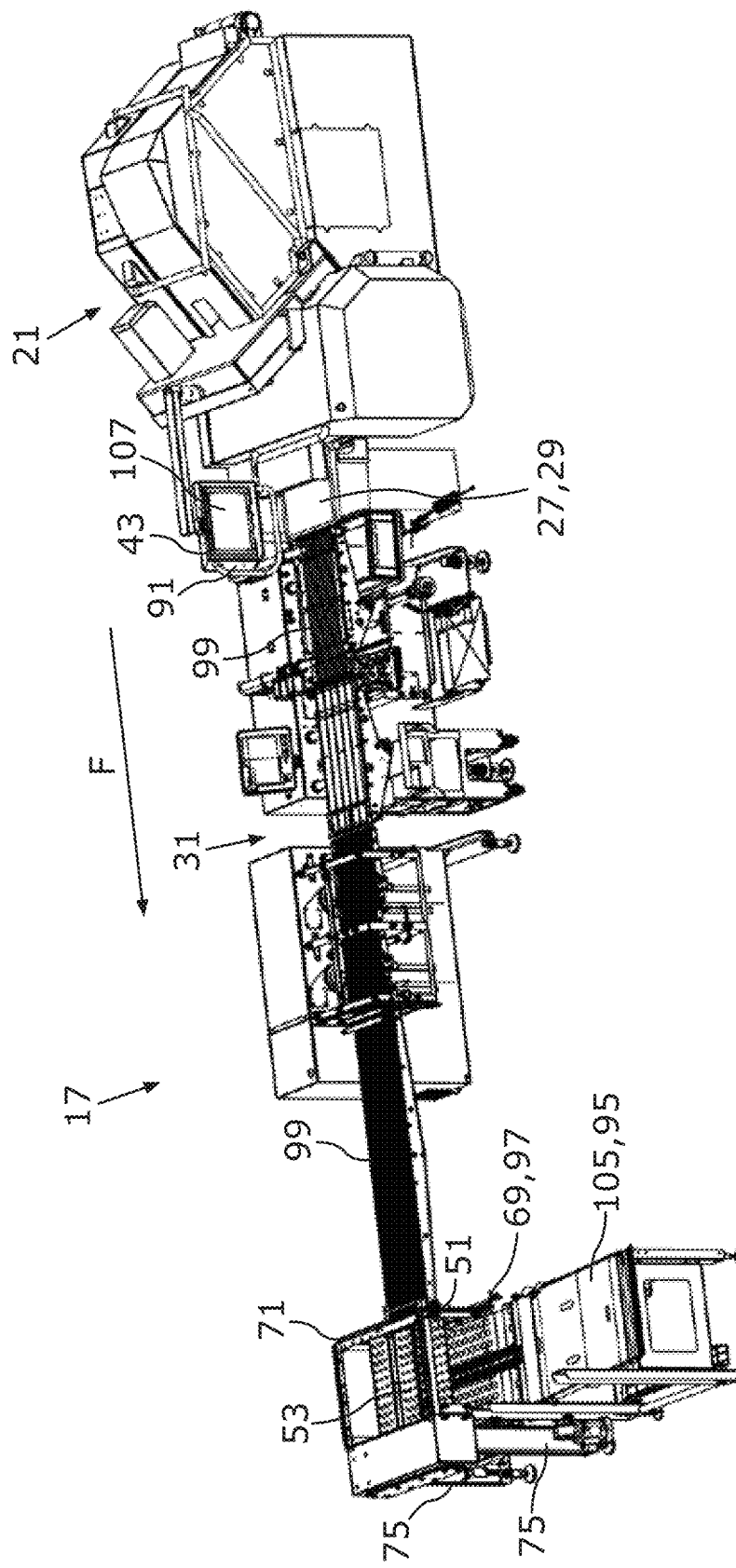
Figure 2:
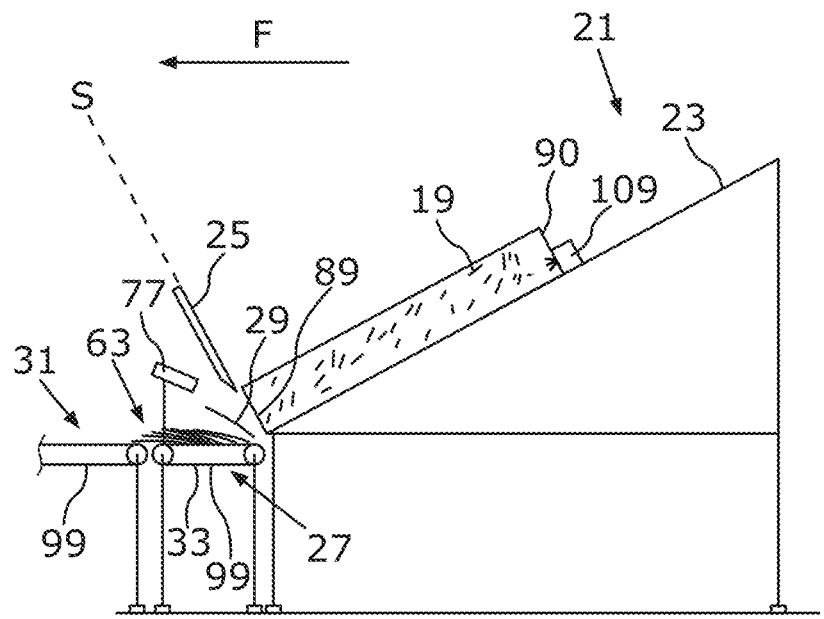
Figure 3:
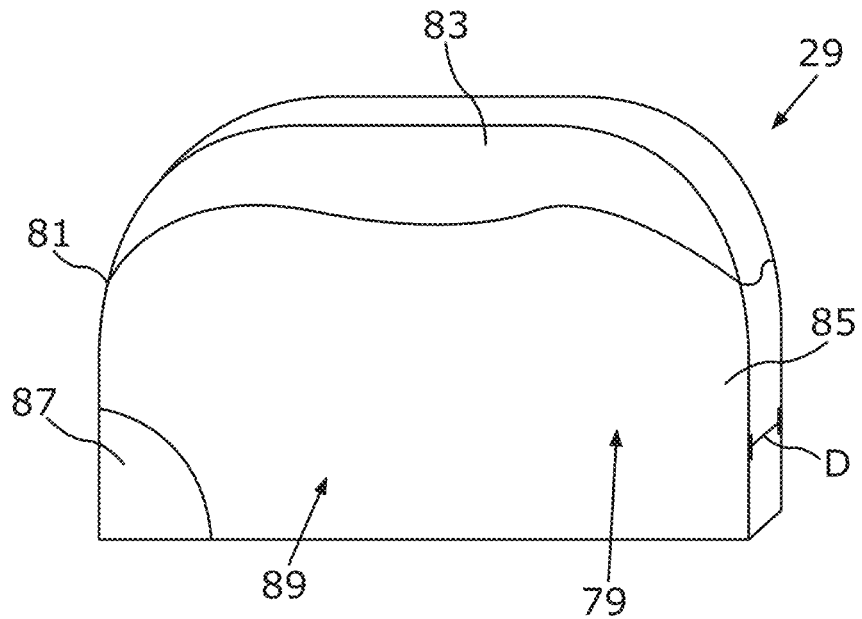
Figure 4A:
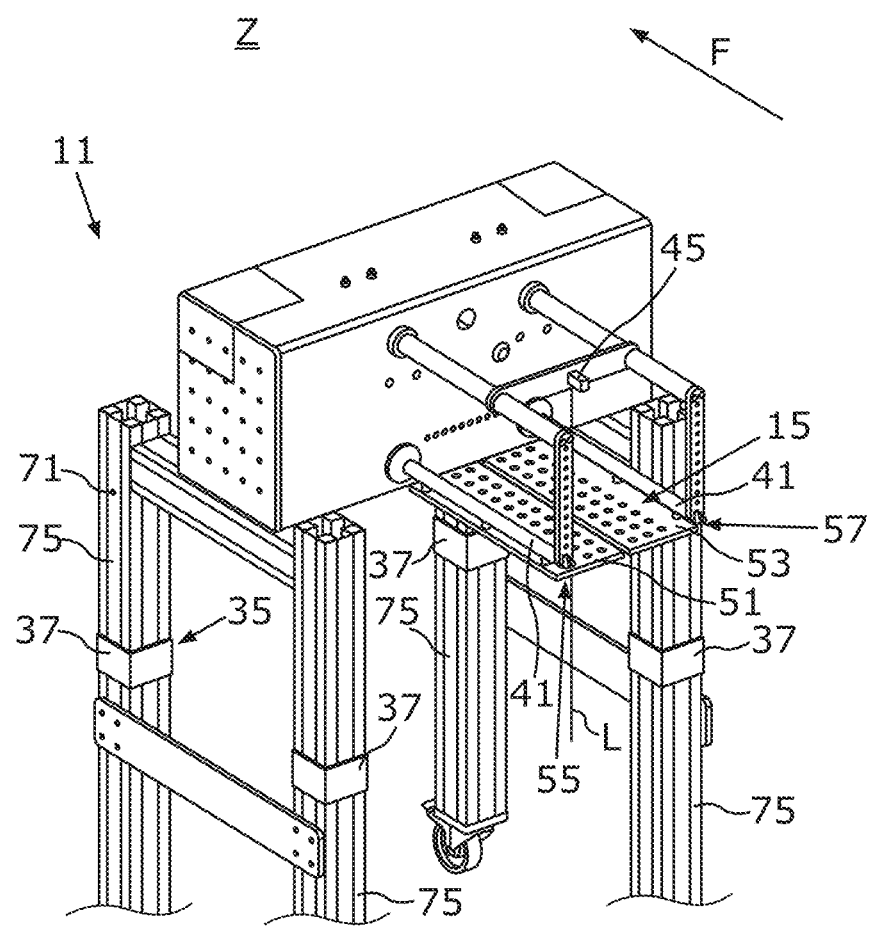
Figure 4B:
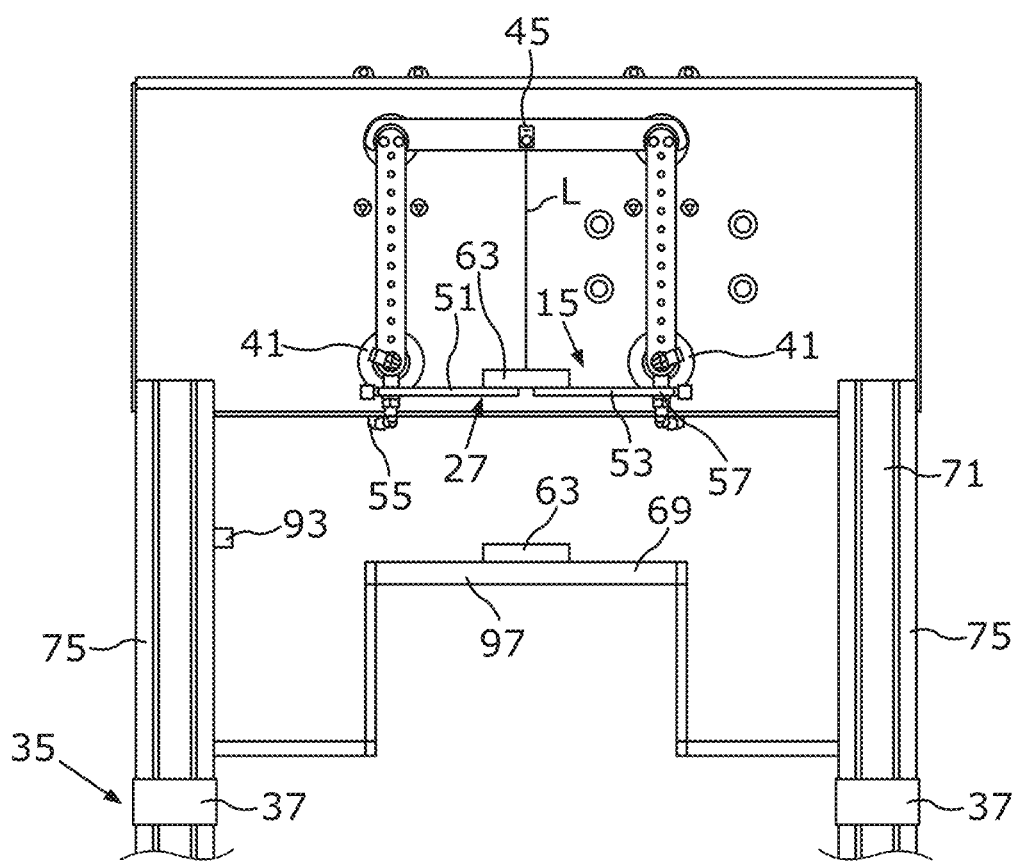
Figure 5A:
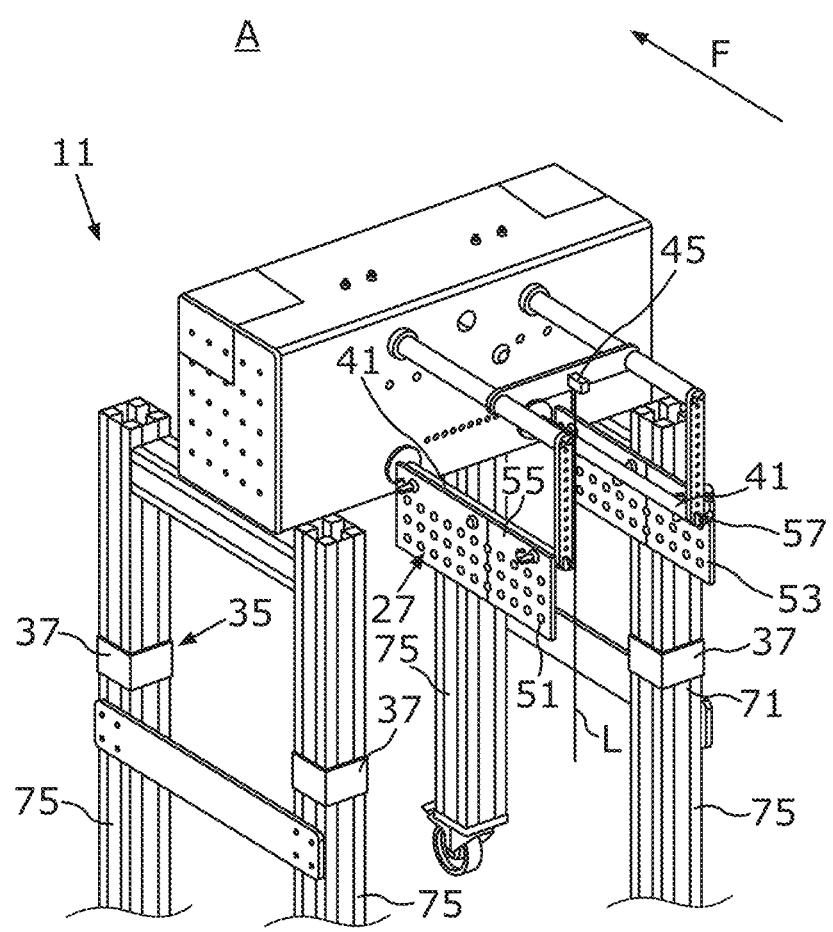
Figure 5B:
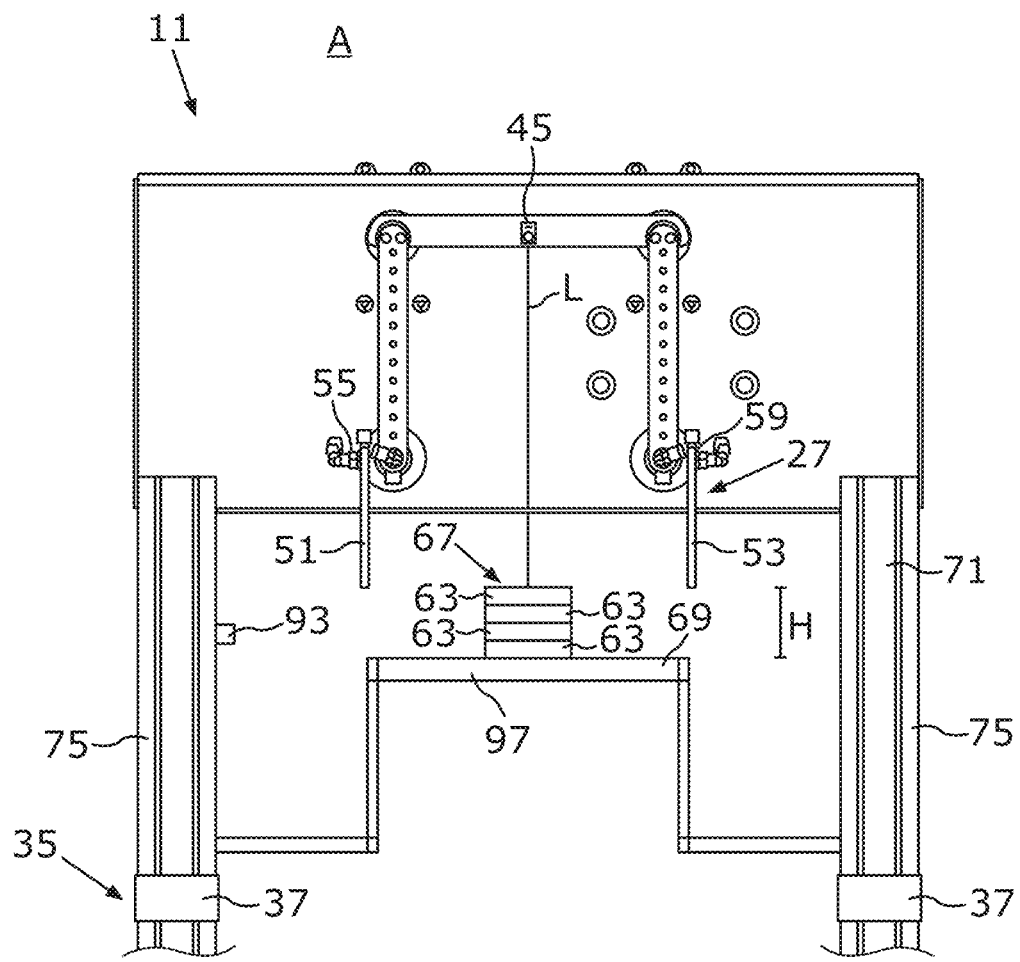
Figure 6:
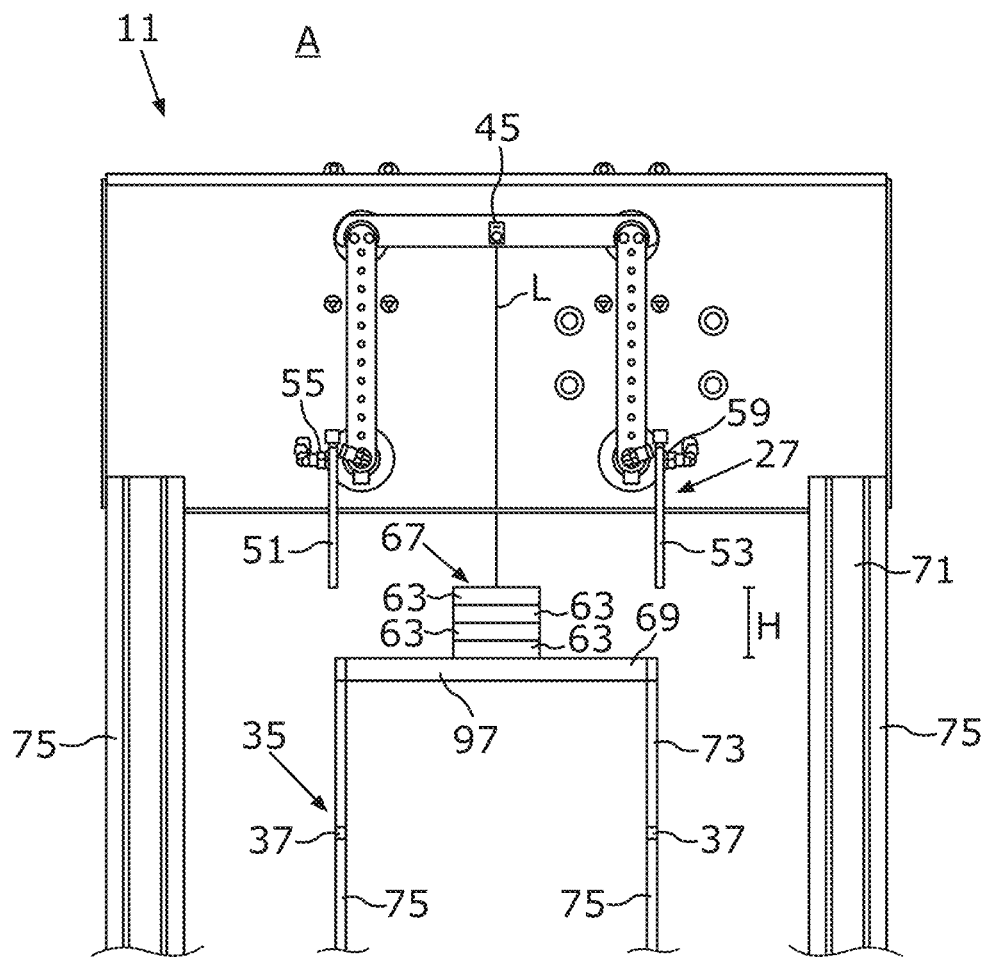
Figure 7:
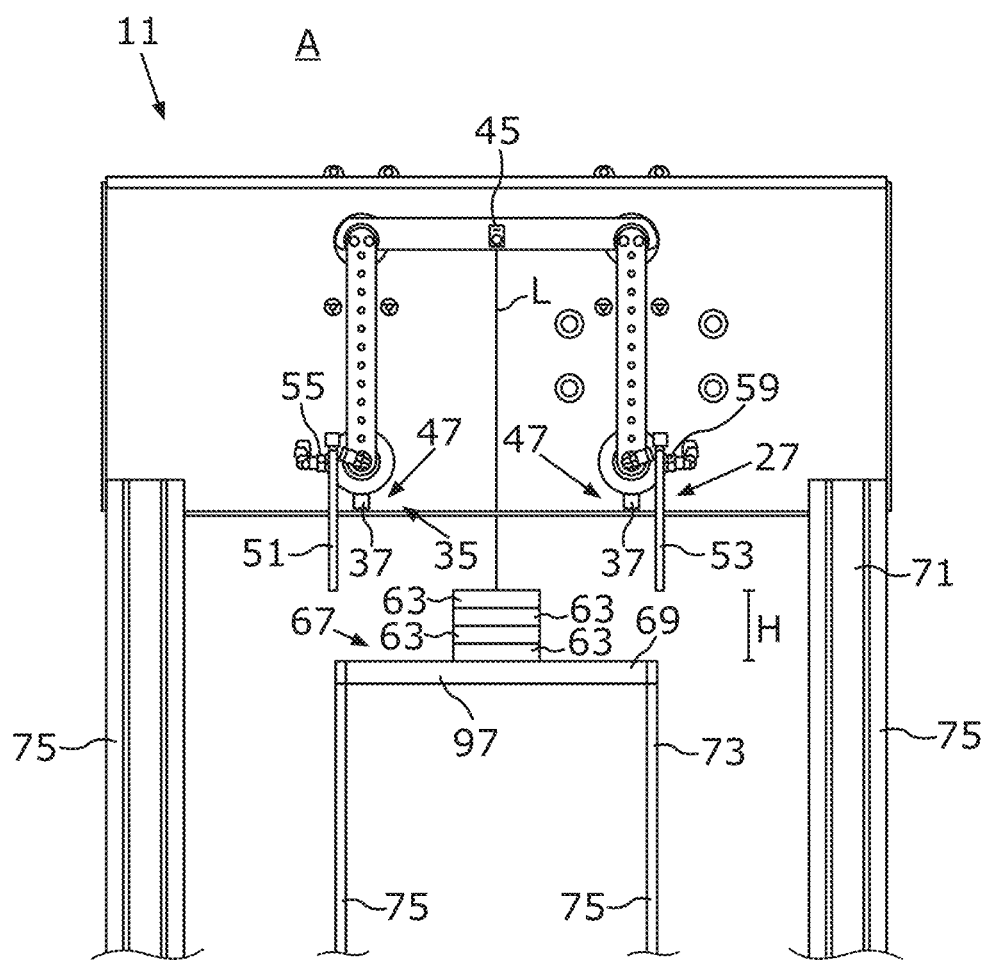
Figure 8A:
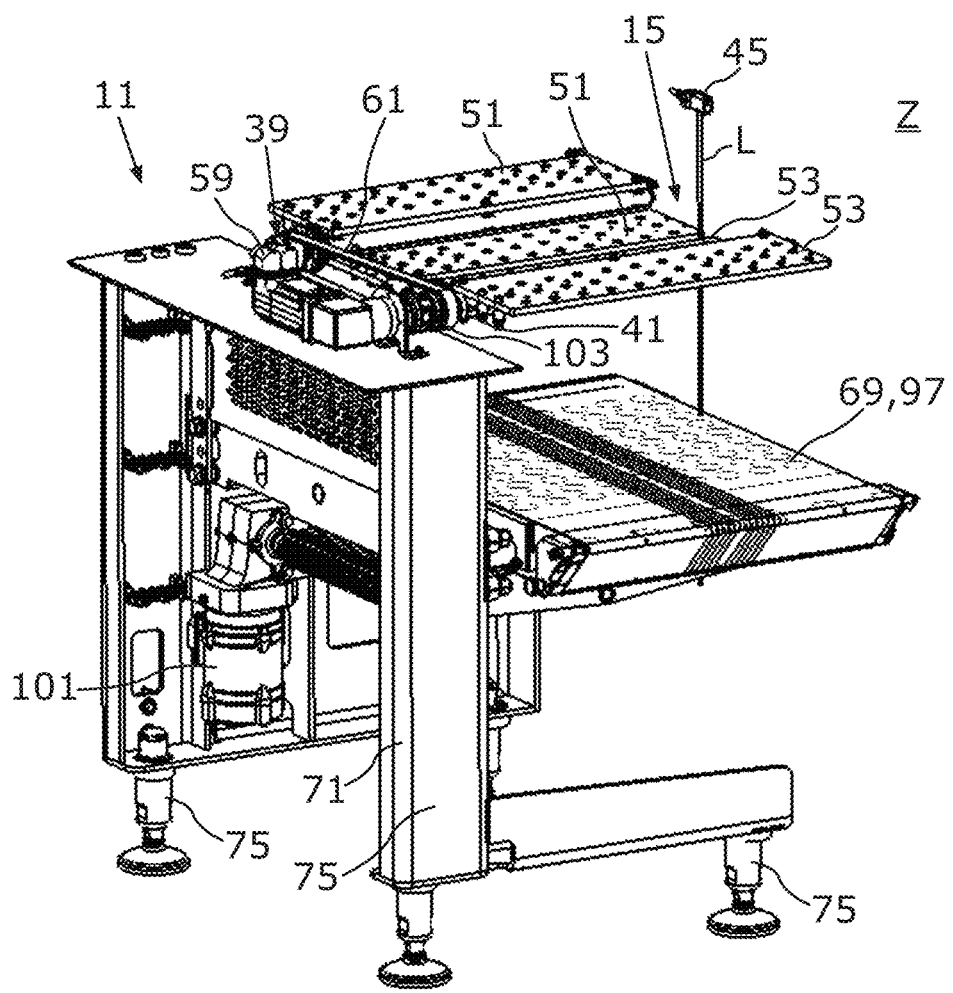
Figure 8B:
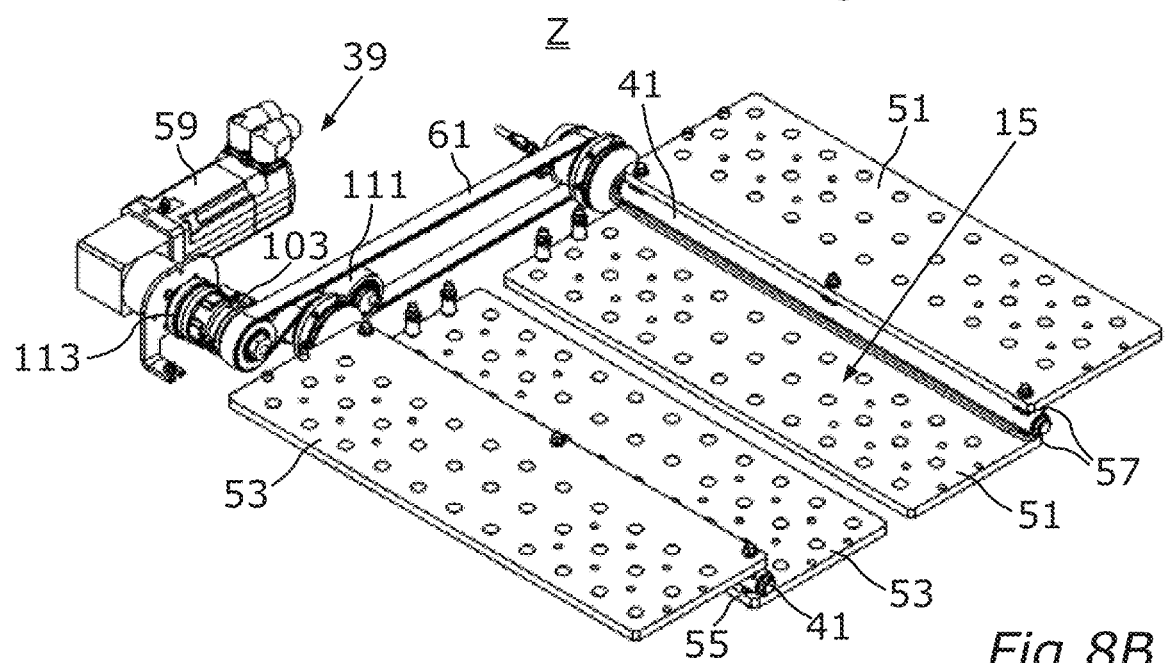
Figure 9A:
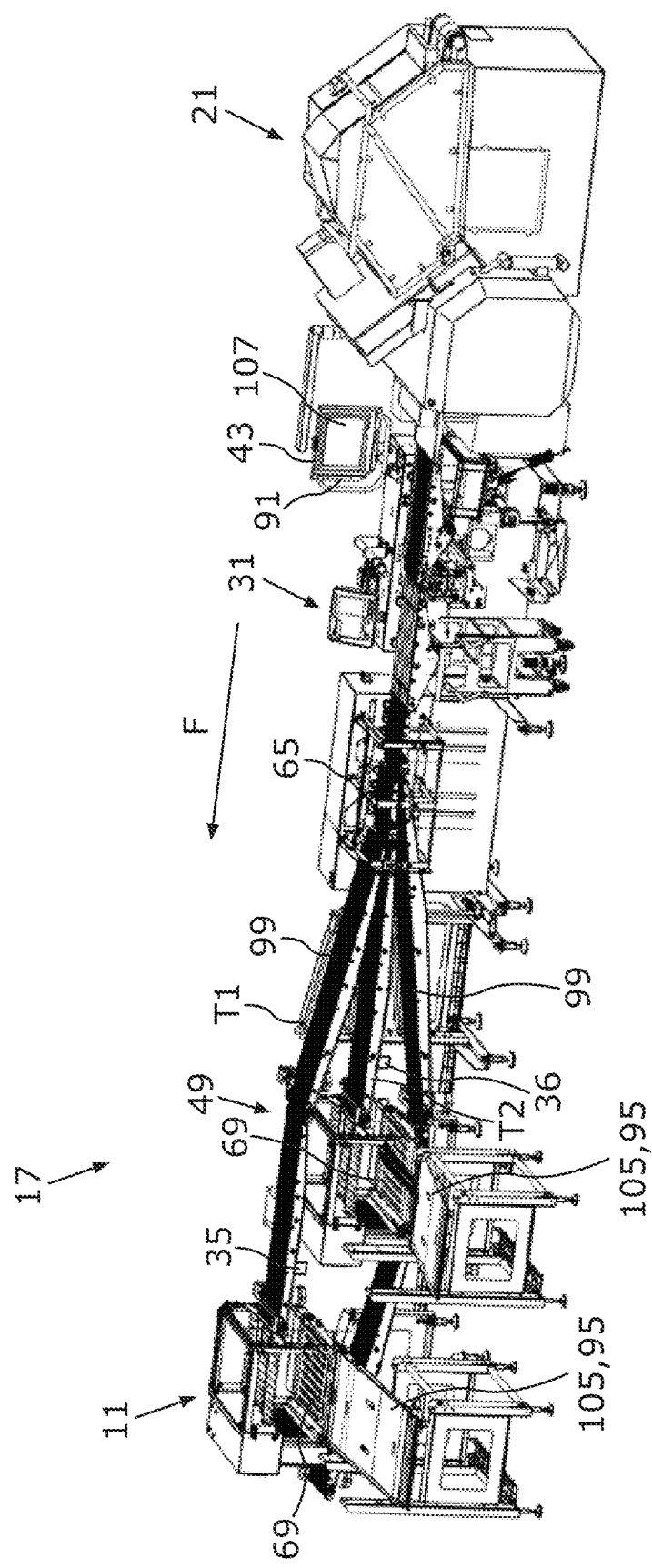
Figure 9B:
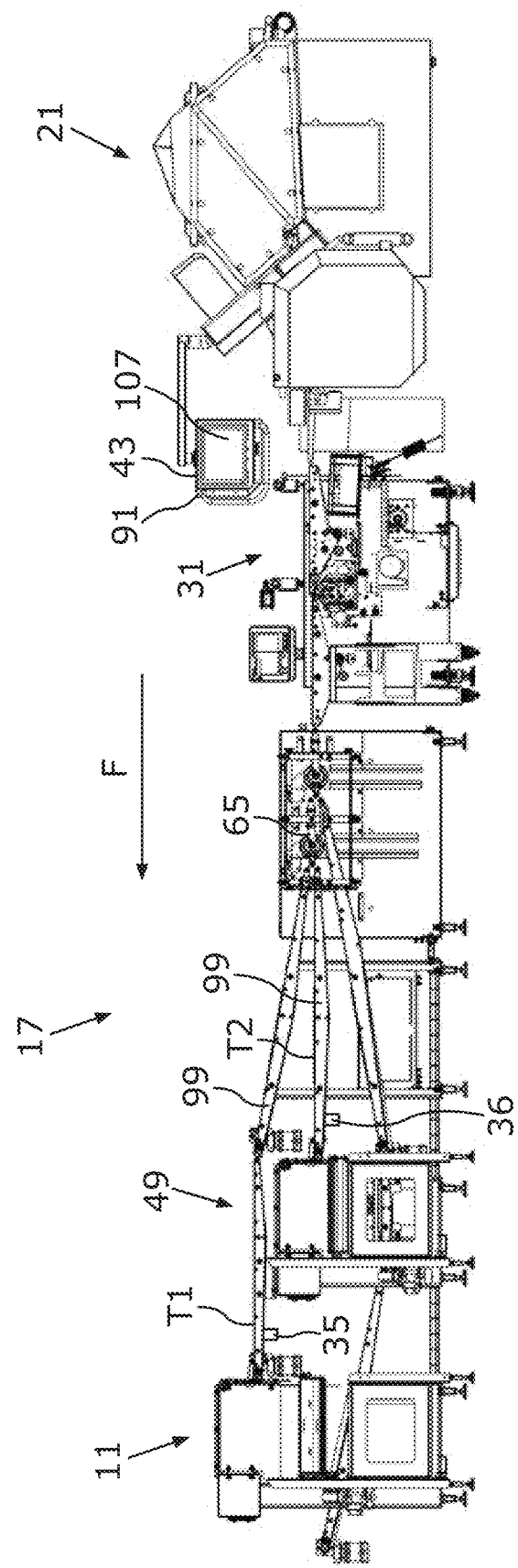

The invention will be explained in the following purely by way of example with reference to embodiments and to the drawings. There are shown:

FIGS. 1A and 1B a respective perspective representation of a system for processing food products that comprises a slicing apparatus for producing part portions that comprise one or more slices cut off from a food product; a transport device; and a stacking apparatus that is configured to stack the part portions on a stacking section and to form a food portion comprising a plurality of part portions;

FIG. 2 a schematic representation of the slicing apparatus;

FIG. 3 a representation of a slice cut off from the food product;

FIGS. 4A and 4B a perspective view and a front view of the stacking apparatus with product supports located in a feed position in which part portions may be moved onto the product supports;

FIGS. 5A and 5B a perspective view and a front view of the stacking apparatus with the product supports moved into a placement position in which the part portions moved onto the product supports may be placed on the stacking section;

FIG. 6 a front view of a further embodiment of the stacking apparatus;

FIG. 7 a front view of a further embodiment of the stacking apparatus;

FIGS. 8A and 8B a perspective rear view of an embodiment of the stacking apparatus and a perspective view of a drive of the stacking apparatus for moving the product supports;

FIGS. 9A and 9B a perspective view and a side view of a further embodiment of a system for processing foods; and FIG. 10 a schematic view of a further embodiment of a system for processing foods.

FIGS. 1A and 1B show a system 17 for processing food products 19 that may in particular be meat products, sausage, cheese, ham and/or bacon (cf. also FIGS. 2 and 3). The system 17 comprises a slicing apparatus 21 that is schematically illustrated in FIG. 2.

The slicing apparatus 21 has a product feed 23 by means of which the bar-shaped food product 19 may be guided into a cutting plane S in which a blade 25, which may in particular be configured as a circular blade or a scythe-like blade, revolves and cuts off slices 29 from the front product end 89. For this purpose, the product feed 23 in particular comprises a product gripper 103 that engages into the food product 19 at a rear product end 90 and that advances the food product 19 in the direction of the cutting plane S.

The slices 29 cut off by the blade 25 fall onto a portioning section 27 and the slicing apparatus 21 is configured to form a part portion 63, which comprises a plurality of slices 29 cut off from the food product 19, on the portioning section 27. In this respect, the portioning section 27 comprises a conveying device 33 having a continuously revolving conveyor belt 99 so that the slices 29 collected on the portioning section 27 may be moved along a conveying direction F while further slices 29 are cut off from the product 19 to arrange the slices 29 of the part portion 63 in a mutually overlapping manner. The part portion 63 may thereby already be partly disposed on a conveyor belt 99 of a transport device 31 arranged downstream of the portioning section 27 while slices 29 are still being added to the part portion 63, wherein the completed part portion 63 may ultimately be transferred to the transport device 31 by means of the conveying device 33. To separate consecutive part portions 63, the slicing apparatus 21 may be configured to perform one or more blank cuts during which the blade 25 indeed performs a revolution, but no slice 29 is cut off. For this purpose, the product gripper 109 may, for example, briefly retract the food product 19 and/or the blade 25 may be moved out of the cutting plane S and may be removed from the food product 19.

The slicing apparatus 21 illustrated in FIG. 2 furthermore has an optical scale 77 by means of which a desired thickness D of a slice 29 to be cut off may be determined at which the slice 29 has a predefined desired weight (cf. also FIG. 3). The optical scale 77 is configured to determine a surface structure 79 and a contour 81 of a front product end 89 of the food product 19, wherein a control device 43, shown in FIGS. 1A and 1B, of the system 17 and in particular of the slicing apparatus 21 may be configured to determine the desired thickness D for the slice 29 to be cut off based on the surface structure 79 determined by the optical scale 77 and the contour 81 of the front product end 89. The control device 43 may further be configured to control the slicing apparatus 21 to cut off the slice 29 with the determined desired thickness D, which may in particular take place by a corresponding setting of a speed of the product feed 23 and/or of a cutting speed of the blade 25.

To be able to determine the surface structure 79 and the contour 81 of the front product end 89, the optical scale 77 may comprise a camera and/or may be configured as a camera by means of which an image of the front product end 89 may be generated. The control device 43 may in particular be configured to determine a density at the front product end 89 by an image analysis and to determine the desired thickness D based on the determined density and the contour 81. Furthermore, the control device 43 may also be configured to determine an area of the front product end 89 based on the contour 81. The evaluation of the surface structure 79 and/or of the contour 81 may take place centrally at the control device 43 shown in FIGS. 1A and 1B or components of the control device 43 for evaluating an image generated by the optical scale 77 may be directly arranged at the optical scale 77 and/or may be integrated into the optical scale 77.

As is illustrated in FIG. 3, the surface structure 79 of the slice 29 to be cut off or of the front product end 89 of the food product 19 may be determined by a fat proportion 83, a meat proportion 85, and a bone proportion 87. The control device 43 may be configured to identify the fat proportion 83, the meat proportion 85, and the bone proportion 87 in an image provided by the optical scale 77 and to determine a density of the front product end 89. For this purpose, respective density values for the fat proportion 83, the meat proportion 85, and the bone proportion 87 may, for example, be stored in a memory 91 so that the control device 43 may determine an average density at the front product end 89 considering the respective size or area of the proportions 83, 85, and 87. The desired thickness D may then be determined based on this density and the area of the front product end 89 predefined by the contour 81 such that the slice 29 to be cut off has the predefined desired weight for a slice 29. Alternatively to the calculation of an average density, the determination of the desired thickness D may also take place such that respective area portions or areas occupied by the fat proportion 83, the meat proportion 85, and the bone proportion 87 are determined and are multiplied by respective stored density values to determine the desired thickness D by a comparison with the desired weight. The density values and the further parameters required for determining the desired thickness D may in particular be stored in a memory 91 of the control device 43, in particular a semiconductor memory. Furthermore, in the memory, association tables may also be stored based on which a density and/or directly the desired thickness D may be determined in dependence on the determined surface structure 79 and the contour 81.

As already mentioned, the conveying device 33 of the portioning section 27 is configured to transfer the part portion 63 along the conveying direction F to a transport device 31 of the system 17 that is arranged downstream of the portioning section 27 and that again comprises a plurality of conveyor belts 99. The transport device 31 is configured to transfer the part portions 63 received from the conveying device 33 to a stacking apparatus 11 and in particular to move them onto product supports 51 and 53 of the stacking apparatus 11 that jointly form a product support surface 15 for the part portions 63 in a feed position Z (cf. also FIGS. 4A to 8B).

The stacking apparatus 11 is illustrated in more detail by means of FIGS. 4A and 8B. The product supports 51 and 53 are horizontally oriented in the feed position Z in which part portions 63 may be placed onto the product supports 51 and 53 (cf. FIGS. 4A and 4B). Furthermore, the product supports 51 and 53 are connected to shafts 41 at respective outer sides 55 and 57, wherein the product supports 51 and 53 may be moved by a rotation of the shafts 41 in opposite directions into a placement position A in which the part portions 63 moved onto the product supports 51 and 53 may be placed beneath the product supports 51 and 53 on a stacking section 69 of the stacking apparatus 11 (cf. FIGS. 5A and 5B). In the embodiment shown, the product supports 51 and 53 may in particular be moved from the feed position Z into the placement position A and into a vertical orientation by rotating the shafts 41 about 90° so that part portions 63 positioned on the product supports 51 and 53 slide off along the product supports 51 and 53 and fall onto the stacking section 69.

As FIGS. 5B to 7 illustrate, by means of the stacking apparatus 11, a plurality of part portions 63 produced by the slicing apparatus 21 may be successively placed on the stacking section 69 and may in particular be stacked on top of one another so that a food portion 67 comprising a plurality of part portions 63 may be formed on the stacking section 69. The completed food portion 67, which here comprises four part portions 63 by way of example, may be transferred from the stacking section 69, which for this purpose comprises a drivable conveyor belt 97, to a further transport device 105 that is shown in FIGS. 1A and 1B and that may, for example, transfer the food portion 67 to a packaging machine, not shown, so that the food portions 67 may be placed in and packaged in respective packages or package parts to be offered for sale in such a manner.

The system 17 may thus enable a complete processing of the food products 19 in that the food products 19 are first cut into slices 29, part portions 63 are formed from a plurality of slices 29, and a plurality of part portions 63 are then joined together by means of the stacking apparatus 11 to form a common food portion 67 that may be packaged and sold. While provision may be made when processing food products 19 for sale for final consumption to package and offer for sale slices 29, which are directly assembled by the slicing apparatus 21, directly as portions, such a preparation of food portions 67 comprising a plurality of part portions 63 may in particular be provided in the case of a sale to bulk buyers, for example, the catering or hotel trade. In this respect, at the slicing apparatus 21, films or sheets of paper may in particular be inserted beneath the part portions 63 by means of an underleaver, not shown, to enable a simple separation of the part portions 63 of a food portion 67 on a removal from the packaging.

In such a system, it is, however, necessary to achieve a high product throughput and portion throughput, on the one hand, but to carry out the process in a controlled manner, on the other hand, wherein in particular a predefined desired food portion weight for the food portions 67 may have to be achieved. Whereas provision is usually made in slicing apparatuses 21 for forming smaller portions to determine the weight of the cut-off slices 29 directly at the portioning section 27 and thereby to check whether the portions formed there have a predefined weight, such a check is usually not possible on a processing of the food products 19 into large food portions 67 comprising a plurality of part portions 63.

To be able to achieve the desired high throughput, the part portions 63 in particular have to be produced following one another as directly as possible by the slicing apparatus 21 and have to be transferred at a small spacing to the transport device 31 so that, for example, a rear end of a first part portion 63 may still be disposed on the portioning section 33 while a subsequent part portion 63 is already being formed. Furthermore, it is illustrated in FIG. 2 that the part portions 63 may frequently also have a length at which some of the slices 29 are already disposed on the transport device 31, while the part portion 63 is still being formed by further slices 29. Therefore, the part portions 63 are frequently not completely disposed on the portioning section 27 or are at least not completely disposed on the portioning section 27 for long enough to be able to measure their weight. The weight of the food portions 67 may therefore frequently only be checked afterwards so that, if necessary, slices 29 may have to be manually added or removed to achieve the desired food portion weight. Accordingly, a possible incorrect setting of the optical scale 77 or incorrect evaluations of the control device 43 may usually also not be corrected.

To counter this problem and nevertheless to enable a checking of the weight of the part portions 63 and/or of the food portion 67, a scale 35 is integrated into the stacking apparatus 11 illustrated by means of FIGS. 4A to 5B and is configured to measure the weight of the part portions 63 and/or of the food portion 67 formed from the part portions 63. In this respect, the scale 35 comprises four load cells 37 that are arranged at respective support sections 75 of a frame 71 of the stacking apparatus 11 and beneath the product supports 51 and 53 and the stacking section 69 so that the product supports 51 and 53 and the stacking section 69 are supported on the ground via the load cells 37 and thus via the scale 35. The weight of the product supports 51 and 53 and of the stacking section 69 may therefore be determined by the scale 35 so that a weight change as a result of a part portion 63 guided onto the product supports 51 and 53 and/or the stacking section 69 may be detected by means of the scale 35. In the embodiment illustrated by means of FIGS. 4A to 5B, the stacking apparatus 11 in particular has a common frame 71 for product supports 51 and 53 and the stacking section 69.

For example, the scale 35 integrated into the stacking apparatus 11 may be used to determine the weight of each of the part portions 63 moved to the stacking apparatus 11 since the weight measured by the scale 35 changes as soon as a part portion 63 is moved onto the product supports 51 and 53. The weight of the part portion 63 is thus determined by the difference of the weight registered by the scale 35 before and after the movement of the part portion 63 onto the product supports 51 and 53. However, the scale 35 arranged at the stacking apparatus 11 also makes it possible to determine the weight of the part portions 63 overall that are already stacked on the stacking section 69 so that the total weight of the food portion 67 ultimately formed may also be measured directly. Alternatively thereto, the total weight of the placed part portions 63 and/or of the food portion may also be determined by adding the previously measured weights of the individual part portions 63.

By providing a scale 35 at the stacking apparatus 11, it is thus not necessary to already determine the weight of the part portions 63 directly at the portioning section 33, but the weight of the part portions 63 may rather be determined at the stacking apparatus 11 which is arranged downstream of the portioning section 27 and at which the part portions 63 are successively received. At the stacking apparatus 11, the part portions 63 are thus disposed in a controlled and complete manner on the product supports 51 and 53 and the stacking section 69 so that sufficient time for a weighing is available there, whereas, at the portioning section 27, slices 29 are added at a high speed and the weight disposed thereon changes at a correspondingly high speed. Furthermore, the transport device 31 may, for example, be configured to equalize the part portions 63 and to increase their spacing from one another during the transport of the part portions 63 from the portioning section 33 to the product supports 51 and 53 in order to further increase the time available for the measurement of the weight at the stacking apparatus 11.

By measuring the weight of the part portions 63 and/or of the food portion 67, the process monitoring and/or process control may in particular be improved in that the weight measured at the stacking apparatus 11 may, for example, be used by the control 43 to adapt settings of the slicing apparatus 21 and/or of the transport device 31.

For example, provision may be made that the control device 43 is configured to perform a regulation in which the weight of the part portions 63 and/or of the food portion 67 measured at the stacking apparatus 11 is the regulation variable, wherein a thickness of the slices 29 and/or a number of slices 29 per part portion 63 forms the control variable. It may in particular be permanently checked during the process whether the part portions 63 reach a desired part portion weight and/or whether the food portions 67 reach a desired food portion weight in order, if necessary, to change the slice thickness and/or the number of slices per part portion 63 and to compensate a deviation. In this respect, the control device 43 may, however, in particular perform a trend regulation in order, for example, to only make an adaptation when too low a weight or too high a weight is systematically determined at a predefined number of part portions 63 and/or food portions 67.

The control device 43 may in particular generally, independently of the performance of a regulation, be configured to adapt a thickness of the slices 29 and/or a number of slices 29 per part portion 63 in dependence on the measured weight of the part portions 63 and/or of the food portion 67.

Furthermore, a predefined number of part portions 63 for a food portion 67 may, for example, be provided in the system 17 in accordance with a basic setting.

However, the control device 43 may be configured to control the stacking apparatus 11 to add a further part portion 63 to the predefined number of part portions already placed on the stacking section 69 when the weight of the predefined number of part portions 63 is less than a predefined desired food portion weight and in this regard to increase the number of part portions 63 for this food portion 67 with respect to the predefined number. This may in particular take place in that the control device 43 controls the stacking apparatus 11 to delay a transporting away of the predefined number of part portions 63 and instead to still place a subsequently received part portion 63 on the part portions 63 already stacked on the stacking section 69. The production of food portions 67 with too low a weight may thereby be reliably and automatically prevented.

Furthermore, as is schematically illustrated in FIGS. 4B and 5B, the stacking apparatus 11 may have a marking and/or signaling device 93, wherein the control device 43 may be configured to control the marking and/or signaling device 93 to mark a food portion 67 with too low a weight and/or to trigger a signal perceptible to a user, in particular an acoustically and/or visually perceivable signal, when the weight of the predefined number of part portions 63 deviates from the desired food weight so that the user may manually add slices 29 or remove slices 29.

Furthermore, provision may in particular be made, in the event of too low a weight of the predefined number of part portions 63, to either automatically add a part portion 63 or to mark the food portion 67 in dependence on a difference from the desired food portion weight so that a user may manually add slices 29. In this respect, a part portion 63 may, for example, be added in the event of a comparatively large difference, whereas, in the event of only small differences, it may be indicated to a user that one or more slices 29 should still be manually added. By considering such a difference, the production of considerably overweight food portions 67 may in particular be prevented when a complete further part portion 63 is added, for instance, in the event of an only small difference.

In this respect, provision may also be made that a minimum difference at which a further part portion 63 is added to the predetermined number of part portions 63 may be predefined by a user via an input device 107, in particular a touchscreen, of the control device 43. A user may thereby in particular also set that a part portion 63 should always be added when the weight of the predetermined number of part portions 63 lies below the desired food portion weight. This may, for example, be provided when a weight-dependent selling price is defined for the food portions 67, but a predefined minimum weight or the desired food portion weight may not be fallen below.

Due to the measurement of the weight at the stacking apparatus 11, not only the weight of the completed food portion 67 may furthermore be measured, but it may also be determined how the weight of the part portions 63 stacked on the stacking section 69 changes during the formation of the food portion. It may thereby, for example, already be predicted during the formation of the food portion 67 whether the predefined number of part portions 63 will reach the desired food portion weight or whether a further part portion 63 will provisionally have to be added. This prediction may in particular be made by the control device 43 and may be used to accelerate the slicing apparatus 21 and/or the transport device 31 when it becomes apparent that yet a further part portion 63 provisionally has to be added to the originally predefined number of part portions 63 in order to reach the desired food portion weight. The time for producing this food portion 67 may be reduced by such an acceleration in order, for example, to still be able to complete the food portion 67 in a certain cycle or in a predefined time despite the addition of the further part portion 63.

The scale 35 may furthermore also act as a checkweigher for the optical scale 77 by, for example, comparing an expected weight of the part portions 63 and/or of the food portion 67, which is determined by the number of slices 29 and their desired weight, with the weight actually measured by the scale 35. If deviations are determined between the actual weight of the part portions 63 or of the food portion 67 and the expected weight, this may be used to correct the determination of the density of the front product end 89 and/or of the desired thickness D of the slice to be cut off by the control device 43 based on the surface structure 79 and the contour 81 of the front product end 89 determined by the optical scale 77 and, for example, to adapt density values stored in the memory 91. Furthermore, the control device 43 may also be configured to execute a self-learning algorithm for determining the desired thickness D that may be optimized consistently and for a wide variety of food products 19, for example different sausage and cheese products, by comparing the expected weight with the weight actually determined by the scale 35.

As FIGS. 4A to 5B further show, the stacking apparatus 11 has a measurement device 45, for example a distance sensor, that is configured to determine, by a measurement L, a height H of the part portions 63 stacked on the stacking section 69 and also of the complete food portion 67. A maximum height may in particular be predefined for the food portion 67 and may, for example, be determined by a package into which the food portion 67 is to be packaged. Due to an additional determination of the weight of the part portions 63 stacked on the stacking section 69, the control device 43 may be configured to sort out part portions 63 which are stacked on the stacking section 69 and whose height H determined by the measurement device 45 already exceeds the maximum height, while their total weight still falls below a desired food portion weight. In this case, the desired food portion weight may no longer be achieved without the predefined maximum height of the food portion 67 being exceeded so that the part portions 63 are not suitable for a further processing and may therefore not be sorted out. For this purpose, the system 17 comprises a sorting-out device 95 that may be formed by the further transport device 105 so that the control device 43 may, for example, control the further transport device 105 to sort out a number of part portions 63 that are not to be used and that are stacked on the stacking section 69. Alternatively thereto, provision may also be made that part portions 63 not to be used are not transferred from the stacking section 69 to the further transport device 105, but are guided into a reject container, not shown, by driving the conveyor belt 97 in the opposite direction.

FIG. 6 shows a further embodiment of the stacking apparatus 11 in which the product supports 51 and 53 are supported via a frame 71, whereas the stacking section 69 is supported via its own frame 73. In this embodiment, load cells 37 of a scale 35 are arranged in respective support sections 75 of the frame 73 so that, in this embodiment, the stacking section 69 comprises the scale 35 and the weight of the part portions 63 and/or of the food portion 67 may be measured on the stacking section 69.

In the embodiment of the stacking apparatus 11 illustrated in FIG. 7, the shafts 41 to which the product supports 51 and 53 are fastened are supported at the frame 71 via respective load cells 37, wherein the load cells 37 are in particular arranged in the region of respective bearings 47 of the shafts 41 or at the bearings 47. The weight of the shafts 41 and the product supports 51 and 53 may thus be determined via the load cells 37, which together form the scale 35, so that the weight of the part portions 63 may be measured when the part portions 63 are located on the product supports 51 and 53. By adding the weight of the individual part portions 63, the weight of the complete food portion 67 may also be determined in this embodiment.

FIGS. 8A and 8B further illustrate a drive 39 by means of which the product supports 51 and 53 may be moved between the feed position Z and the placement position A by rotating the shafts 41. Unlike the embodiment illustrated by means of FIGS. 4A to 7, in the embodiment shown in FIGS. 8A and 8B, two product supports 51 and 53 are arranged at each of the shafts 41 so that, starting from the feed position Z, by rotating the shafts 41 about 180°, two product supports 51 and 53 may again be arranged facing one another in the feed position Z to form a product support surface 15 and to pick up a subsequent part portion 63. However, a corresponding drive 39 may also be provided in the stacking apparatuses 11 shown by means of FIGS. 4A to 7, wherein, in these embodiments, rotations of the shafts 41 about 360° are required to move the product supports 51 and 53 into the feed position Z again. Alternatively thereto, the shafts 41 may be rotated back from the placement position A about 90° to move the product supports 51 and 53 into the feed position Z again. In FIG. 8A, a drive 101 for the conveyor belt 97 of the stacking section 69 can furthermore be seen.

As in particular FIG. 8B shows, a motor 59 is provided for driving the shafts 41 so that the shafts 41 may be jointly driven via a single motor 59. For this purpose, the shafts 41 are connected to one another via a belt 61, wherein the belt 61 is guided via a deflection roller 111 such that the shafts 41 may be driven by the motor 59 to rotate in opposite directions. To transmit a rotation to the shafts 41, a motor shaft 113 of the motor 59 is connected to one of the shafts 41, wherein the transmission of the torque from the motor shaft 113 to the shaft 41 takes place via a friction clutch 103. A maximum torque that may be transmitted to the shaft 41 may be defined via this friction clutch 103 and it may in particular be achieved that the shaft 41 slips through with respect to the motor shaft 113 when the shaft 41 or the product support 53 is blocked. The shaft 41 may thus be stopped even though the motor shaft 113 continues to rotate. Due to the synchronization of the shafts 41, the slipping through of the friction clutch 103, which may also be designated as a slip clutch, furthermore also takes place when the product supports 51 arranged at the other shaft 41 are blocked so that both shafts 41 may be stopped synchronously and with the product supports 51 or 53 oriented in the same rotational position.

The safety of the stacking apparatus 11 may thereby in particular be increased since the shafts 41 may, for example, be stopped on a reaching in of a user during the operation when the user blocks the product supports 51 and 53. An injury to the user due to the transmission of strong forces may thereby be prevented. Due to this safety precaution, enclosures of the stacking apparatus 11 may in particular, as FIGS. 1A and 1B show, be omitted that would otherwise have to be attached to be able to prevent a reaching into the region of the product supports 51 and 53. This in particular enables direct access to the product supports 51 and 53 so that they may, for example, be easily reached for maintenance and/or cleaning purposes and such work may be performed easily and in a less time-consuming manner.

FIGS. 9A and 9B show a further embodiment of the system 17 for processing food products 19 in which a first stacking apparatus 11 and a second stacking apparatus 49 are provided. Furthermore, the transport device 31 comprises a distribution device 65 that is configured to selectively move part portions 63 to the first stacking apparatus 11 or the second stacking apparatus 49 so that the part portions 63 may be selectively moved onto the product supports 51 and 53 of the first stacking apparatus 11 or the second stacking apparatus 49. In this respect, the part portions 63 may be distributed by the distribution device 65 to a first transport path T1 or a second transport path T2, wherein the first transport path T1 leads to the first stacking apparatus 11 and the second transport path T2 leads to the second stacking apparatus 49.

Due to such a distribution device 65, which is here configured as a rocker pivotable about a horizontal axis or a conveyor belt 99 pivotable about a horizontal axis, the part portions 63 may thus be distributed to the transport paths T1 and T2 extending above one another and the spacing between consecutive part portions 63 at the transport paths T1 and T2 may, for example, be increased by an alternate distribution of part portions 63 to the transport paths T1 and T2 with respect to the spacing of the part portions 63 on the transfer from the portioning section 27 to the transport device 31. Due to this increased spacing, the weight of the part portions 63 may in particular be determined at the transport paths T1 and T2 and thus between the distribution direction 65 and the first stacking apparatus 11 or the second stacking apparatus 49 since sufficient time for a precise measurement is now available.

For this purpose, the system 17 comprises two scales 35 and 36, wherein the scale 35 is arranged between the distribution device 65 and the first stacking apparatus 11 to be able to determine the weight of part portions 63 moved to this stacking apparatus 11. The second scale 36 is arranged between the distribution direction 65 and the second stacking apparatus 49 at the second transport path T2 to be able to accordingly determine the weight of the part portions 63 moved to the second stacking apparatus 49. In this respect, the scales 35 and 36 may in particular be integrated into respective conveyor belts 99 and a measurement may take place while the part portions 63 are moved on the respective conveyor belt 99. Alternatively thereto, the respective conveyor belt 99 may be briefly stopped to determine the weight of the part portion 63.

In this embodiment, the part portions 63 may thus so-to-say be equalized by the distribution of the transport paths T1 and T2 to enable a determination of the weight of the part portions 63 and also of the food portions 67 formed at the respective stacking apparatuses 11 and 49. This weight may, as explained above, in particular be considered in the control of the slicing apparatus 21 and/or of the transport device 31. Furthermore, provision may be made that the control device 43 is configured to distribute part portions 63 to the first transport path T1 and the alternative transport path T2 such that an at least approximately equal total weight of food products 19 is processed at the two stacking apparatuses 11 and 49. For this purpose, an overweight part portion 63 may, for example, be intentionally produced and guided to the respective stacking apparatus 11 or 49 when a lower weight has been processed at one of the transport paths T1 or T2 compared to the other transport path T2 or T1.

FIG. 10 schematically shows a further embodiment of a system 17 for processing food portions 19, wherein the individual components may generally be configured as shown in the further Figures. In this embodiment, as in the embodiment illustrated by means of FIGS. 9A and 9B, a transport device 31 having a distribution device 65 is provided to distribute part portions 63 produced by a slicing apparatus 21 to a first transport path T1 and a second transport path T2. In this respect, the distribution device 65 is schematically shown movable along a double arrow P to be able to distribute the part portions 63 to the transport paths T1 and T2 extending laterally offset from one another, wherein a configuration as a rocker as in the system 17 shown in FIGS. 9A and 9B is, however, also possible. In this embodiment, the part portions 63 are also formed on a portioning section 27 of the slicing apparatus 21 and are transferred to the transport device 31 by a conveying device 33 of the portioning section 27.

Unlike the embodiment of FIGS. 9A and 9B, in the system shown in FIG. 10, only one stacking apparatus 11 is provided to which the transport paths T1 and T2 guide the respective part portions 63 received from the distribution device 65. Here, too, the spacing between the part portions 63 on the transport paths T1 and T2 is, however, increased compared to the spacing between the part portions 63 at the transition between the conveying device 33 of the portioning section 27 and the transport device 31 so that the part portions 63 may be weighed by means of respective scales 35 and 36 arranged at the transport paths T1 and T2 and the weight of the part portions 63 may be considered by a control device 43 as explained above.

REFERENCE NUMERAL LIST 11 stacking apparatus
15 product support surface
17 system
19 food product
21 slicing apparatus
23 product feed
25 blade
27 portioning section
29 slice
31 transport device
33 conveying device
35 scale
36 scale
37 load cell 39 drive
41 shaft
43 control device
45 measurement device
47 bearing
49 second stacking apparatus
51 first product support
53 second product support
55 outer side
57 outer side
59 motor
61 belt
63 part portion
65 distribution device
67 food portion
69 stacking section
71 frame
73 frame
75 support section
77 optical scale
79 surface structure
81 contour
83 fat proportion
85 meat proportion
87 bone proportion
89 front product end
90 rear product end
91 memory
93 marking and/or signaling device
95 sorting-out device
97 conveyor belt
99 conveyor belt
101 drive
103 friction clutch
105 further transport device
107 input device
109 product gripper
111 deflection roller
113 motor shaft
A placement position
D desired thickness
F conveying direction
H height
L measurement
P double arrow
S cutting plane
T1 first transport path
T2 second transport path
Z feed position

The invention claimed is:

1. A system for processing food products, said system comprising
a slicing apparatus having a portioning section and a blade movable in a cutting plane and being configured to cut off slices from bar-shaped food products guided into the cutting plane and to form part portions in the portioning section that comprise one or more cut-off slices;
a transport device adjoining the portioning section, wherein the portioning section comprises a conveying device that is configured to transfer the part portions to the transport device; and
a stacking apparatus that has at least one product support movable between a feed position and a placement position and a stacking section arranged beneath the product support,
wherein the stacking apparatus is configured to place part portions moved onto the product support on the stacking section by moving the product support from the feed position into the placement position and to form a food portion comprising a plurality of part portions on the stacking section,
wherein the transport device is configured to transport the part portions received from the conveying device onto the product support of the stacking apparatus, and
wherein at least one of the transport device or the stacking apparatus has a scale for measuring the weight of at least one of the part portions or the food portion.

2. A system in accordance with claim 1,
wherein the scale is integrated into the stacking apparatus.

3. A system in accordance with claim 1,
wherein the stacking section has the scale, wherein the scale is configured to measure the weight of the part portions placed on the stacking section.

4. A system in accordance with claim 1,
wherein at least one of the product support or the stacking section can be supported on the ground via a frame, wherein the scale is arranged beneath the at least one of the product support or beneath the stacking section at the frame.

5. A system in accordance with claim 1,
wherein the stacking apparatus has a drive for moving the product support, wherein at least one of the drive or the product support can be supported on the ground via the scale.

6. A system in accordance with claim 5,
wherein the drive comprises a motor and a shaft via which the product support is connected to the motor, wherein the shaft is supported at the stacking apparatus via at least one bearing, and wherein the scale is arranged at the at least one bearing.

7. A system in accordance with claim 1,
wherein the transport device has a first transport path and a second transport path and wherein the transport device comprises a distribution device that is configured to selectively distribute part portions received from the conveying device to the first transport path or the second transport path,
wherein the system has a first stacking apparatus and a second stacking apparatus;
wherein the transport device is configured to move the part portions via the first transport path onto the product support of the first stacking apparatus and via the second transport path onto the product support of the second stacking apparatus,
wherein the system has a first scale and a second scale, wherein the first scale is arranged at the first transport path and the second scale is arranged at the second transport path.

8. A system in accordance with claim 1,
wherein the system has a control device that is configured to adapt the operation of the system in dependence on a measurement result of the scale.

9. A system in accordance with claim 8,
wherein the control device is configured to adapt at least one of a number of slices of a part portion or a thickness of the cut-off slices in dependence on the measurement result of the scale.

10. A system in accordance with claim 8,
wherein the control device is configured to perform a regulation in which the number of slices of a part portion or the thickness of the slices is the control variable and at least one of the weight of the part portions or of the food portion measured by means of the scale is the regulation variable.

11. A system in accordance with claim 8, wherein the slicing apparatus comprises an optical scale that is configured to determine a surface structure and a contour of a front product end of the food product facing the cutting plane, wherein the control device is configured to determine a density of the slice to be cut off from the front product end based on the determined surface structure, to determine a desired thickness of the slice to be cut off based on the determined density and the determined contour, at which desired thickness the cut-off slice has a predefined desired weight, and to control the slicing apparatus to cut off the slice with the desired thickness, wherein the control device is further configured to adapt the determination of at least one of the density or of the desired thickness in the event of a deviation of the measurement of the scale from at least one of a desired part portion weight determined by the number of slices or from a desired food portion weight.

12. A system in accordance with claim 11, wherein the control device is configured to determine at least one of a fat proportion, a meat proportion, or a bone proportion within the contour of the front product end based on the surface structure, wherein the control device is further configured to at least one of calculating at least one of the density or the desired thickness of the slice to be cut off from the front product end in dependence on the respective proportion or the respective proportions; or looking up at least one of the density or the desired thickness of the slice to be cut off from the front product end in a look-up table.

13. A system in accordance with claim 12, wherein the control device is configured to adapt at least one of parameters for calculating the density or the look-up table in dependence on the measurement of the scale.

14. A system in accordance with claim 11, wherein the control device is configured to execute a self-learning algorithm for determining the at least one of the density or the desired thickness of the slice to be cut off from the front product end and to optimize said self-learning algorithm considering the measurement of the scale.

15. A system in accordance with claim 8, wherein a predetermined number of part portions is provided for the food portions, wherein the control device is configured to at least one of:

controlling the stacking apparatus to add a further part portion after the placement of the predetermined number of part portions when the weight of the predetermined number of part portions measured by the scale is less than a desired food portion weight provided for the food portions; or controlling a marking or signaling device of the system, in the event of a deviation of the weight of the predetermined number of part portions measured by the scale from the desired food portion weight, to mark the food portion or to trigger a signal perceptible to a user.

16. A system in accordance with claim 15, wherein the control device is configured, when the weight of the predetermined number of part portions measured by means of the scale is less than a desired food portion weight provided for the food portions, either to control the stacking apparatus to add a further part portion or to control the marking or signaling device to mark the food portion or to trigger the signal perceptible to a user in dependence on a difference between the weight measured by the scale and the desired food portion weight.

17. A system in accordance with claim 15, wherein a minimum difference at which the control device controls the stacking apparatus to add a further part portion can be set via an input device of the control device.

18. A system in accordance with claim 8, wherein the stacking apparatus comprises a measurement device for determining a height of part portions placed on the stacking section, and wherein the system comprises a sorting-out device, wherein the control device is configured to control the sorting-out device to sort out the placed part portions when the determined height exceeds a predefined or predefinable maximum height and the measured weight of the placed part portions falls below a desired food portion weight.

19. A system in accordance with claim 8, wherein the control device is configured to adapt at least one of a cutting speed of the slicing apparatus or a transport speed of the transport device in dependence on the measurement of the scale during the formation of a food portion.

20. A system in accordance with claim 8, wherein the system comprises at least a first stacking apparatus and a second stacking apparatus as well as a first scale for determining at least one of the weight of the part portions moved to the first stacking apparatus or the weight of the food portion formed at the first stacking apparatus and a second scale for determining at least one of the weight of the part portions moved to the second stacking apparatus or the weight of the food portion formed at the second stacking apparatus, wherein the transport device has a distribution device for selectively distributing the part portions to the first stacking apparatus or the second stacking apparatus, wherein the control device is configured to control the distribution device in dependence on measurements of the first scale and the second scale.

* * * * *